US012713252B2

(12) United States Patent
Al-Mufti et al.

(10) Patent No.: US 12,713,252 B2
(45) Date of Patent: Aug. 18, 2026

(54) SPECTRUM ACCESS SYSTEM (SAS)/SERVICE MANAGEMENT AND ORCHESTRATION (SMO) INTERFERENCE MITIGATION FOR REMOTE INTERFERENCE

(71) Applicant: Boost SubscriberCo L.L.C., Englewood, CO (US)

(72) Inventors: Khalid Walid Al-Mufti, Sterling, VA (US); Dhaval Dipak Mehta, Aldie, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 328 days.

(21) Appl. No.: 18/619,783

(22) Filed: Mar. 28, 2024

(65) Prior Publication Data

US 2025/0310790 A1 Oct. 2, 2025

(51) Int. Cl.
*H04W 24/02* (2009.01)

(52) U.S. Cl.
CPC .................................. *H04W 24/02* (2013.01)

(58) Field of Classification Search
CPC ..... H04W 24/02; H04W 88/12; H04W 88/18; H04L 41/0631; H04L 41/0823; H04L 41/0894; H04L 41/895; H04L 41/16; H04L 41/40
USPC .......................................................... 370/328
See application file for complete search history.

(56) References Cited

U.S. PATENT DOCUMENTS

| | | | | |
|---|---|---|---|---|
| 10,334,473 | B2 * | 6/2019 | Bercovici | H04W 28/04 |
| 2022/0295309 | A1 * | 9/2022 | Akhtar | H04W 24/02 |
| 2024/0063945 | A1 * | 2/2024 | Zhang | H04L 27/2605 |
| 2024/0106709 | A1 * | 3/2024 | Shete | H04L 41/16 |
| 2024/0236691 | A1 * | 7/2024 | Bonati | H04W 24/02 |
| 2024/0251376 | A1 * | 7/2024 | Cheung | H04W 72/20 |
| 2024/0292229 | A1 * | 8/2024 | Bhatia | H04W 16/14 |
| 2024/0297922 | A1 * | 9/2024 | Ghalam | H04L 41/5051 |
| 2024/0319324 | A1 * | 9/2024 | Liu | G01S 7/0233 |
| 2024/0422587 | A1 * | 12/2024 | Wang | H04B 7/0452 |

(Continued)

OTHER PUBLICATIONS

"OnGo Coexistence Technical Specifications/OnGo-TS-2001-V3.2.0," Published May 23, 2022.

(Continued)

*Primary Examiner* — Jean A Gelin
(74) *Attorney, Agent, or Firm* — Kilpatrick Townsend & Stockton LLP

(57) ABSTRACT

A system for mitigating remote interference in a mobile network is disclosed. The system includes a first Service Management and Orchestration (SMO) device. The first SMO device receives, from the second SMO device, a first message indicating that a first base station is experiencing interference from a second base station. The first SMO device identifies the second base station based at least in part upon the aggressor set identifier (ID). The first SMO device receives, from the second SMO device, at least one recommended interference mitigation procedure to address the interference experienced by the first base station. The first SMO device selects one of the procedures and performs the selected interference mitigation procedure. The first SMO device communicates to the second SMO device a second message indicating that the first interference mitigation procedure has commenced.

20 Claims, 8 Drawing Sheets

800

START
802 RECEIVE A MESSAGE INDICATING AN INTERFERENCE CAUSED BY AN AGGRESSOR BASE STATION ?
NO
YES
804 IDENTIFY THE AGGRESSOR BASE STATION BASED AT LEAST ON AGGRESSOR SET ID ASSOCIATED WITH THE AGGRESSOR BASE STATION
806 RECEIVE, FROM THE COMPUTING DEVICE, A SET OF RECOMMENDED INTERFERENCE MITIGATION PROCEDURES
808 SELECT A FIRST INTERFERENCE MITIGATION PROCEDURE FROM AMONG THE SET OF RECOMMENDED INTERFERENCE MITIGATION PROCEDURES
810 PERFORM THE FIRST INTERFERENCE MITIGATION PROCEDURE
812 COMMUNICATE, TO THE COMPUTING DEVICE, A SECOND MESSAGE INDICATING THAT THE FIRST INTERFERENCE MITIGATION PROCEDURE HAS COMMENCED
END

(56) References Cited

U.S. PATENT DOCUMENTS

| | | | | |
|---|---|---|---|---|
| 2024/0430814 | A1* | 12/2024 | Gad | H04W 24/02 |
| 2025/0071029 | A1* | 2/2025 | Soldati | H04L 41/16 |
| 2025/0287242 | A1* | 9/2025 | Soldati | H04W 24/02 |
| 2025/0360560 | A1* | 11/2025 | Wang | B22F 9/023 |
| 2026/0066952 | A1* | 3/2026 | Huang | H01Q 3/34 |

OTHER PUBLICATIONS

O-RAN, O-RAN.WG1.OAD.R003-v10.00, "O-RAN Work Group 1 (Use Cases and Overall Architecture)," © 2023.
3GPP TS 38.300 V18.0.0 (Dec. 2023) Technical Specification, 3rd Generation Partnership Project; Technical Specification Group Radio Access Network; NR; NR and NG-RAN Overall Description; Stage 2 (Release 18).
Khalid Walid Al-Mufti, U.S. Appl. No. 18/619,530, filed Mar. 28, 2024, "Spectrum Access System (SAS)-coordinated Time Division Duplexing (TDD) configuration for Citizen Broadband Radio Service (CBRS)."
Khalid Walid Al-Mufti, U.S. Appl. No. 18/619,666, filed Mar. 28, 2024, "Radio Access Network (RAN) Intelligent Controller Application (rAPP)-coordinated Time Division Duplexing (TDD) configuration in Open Radio Access Network (O-RAN)."

* cited by examiner

SPECTRUM ACCESS SYSTEM (SAS)/SERVICE MANAGEMENT AND ORCHESTRATION (SMO) INTERFERENCE MITIGATION FOR REMOTE INTERFERENCE

TECHNICAL FIELD

The present disclosure relates generally to wireless communication, and more specifically to Spectrum Access System (SAS)/Service Management and Orchestration (SMO) interference mitigation for remote interference.

BACKGROUND

Network nodes, such as base stations communicate data to one another and other devices. In some cases, a network node may cause cross-link interference on another network node.

SUMMARY

The system described in the present disclosure provides several practical applications and technical advantages that overcome the current technical problems in wireless communication technology as described herein. The following disclosure is particularly integrated into a practical application of improving the interference mitigation techniques by reducing interference among network nodes and therefore improving the underlying operations of the network nodes. This, in turn, improves the network resource utilization and reduces network congestion caused by interference.

In the existing systems, there is a challenge in synchronizing Time Division Duplexing (TDD) configurations among Citizens Broadband Radio Service Devices (CBSDs) that are within a TDD-connected set. The guard time between uplink and downlink transmissions from different CBSDs is to be set in a TDD configuration. If a first CBSD starts transmitting downlink signal, and meanwhile, a second CBSD is in receiving mode before the guard time is ended, the second CBSD may experience cross-link interference from the first CBSD. Within a TDD-connected set, different pairs of CBSDs may have different distances from each other. This causes the in-flight delays between pairs of CBSDs to vary, which, in turn, causes the propagation delay between pairs of CBSDs to vary. In the current system, the in-flight delay between a pair of CBSDs is not accounted for in determining a TDD configuration.

In the current systems, the individual CBSDs or their managing schedulers may not have the necessary information about the distances to other CBSDs, particularly those operated by different Mobile Network Operators (MNOs), to set the guard time independently. Moreover, there is currently no system for sharing distance information among different RAN deployments, which aggravates the problem when CBSDs within the same TDD-connected set are managed by different entities, e.g., different Service Management and Orchestration (SMOs).

Furthermore, in the current systems, the CBSDs, in a TDD-connected set, are not aware of the required guard time to synchronize their uplink and downlink transmissions. Thus, the CBSDs are not able to automatically update or adjust their TDD configuration to mitigate possible, anticipated, and/or experienced cross-link interferences. This leads to degraded performance of CBSDs, network interference, network congestion, and overall poor network communication among the UEs 102 and CBSDs. Similar problems exist for cases in Open Radio Access Network (O-RAN) where SMOs manage the orchestration and service management of RAN elements but lack a system-wide approach to coordinate the operational parameters, such as guard time, across different administrative domains.

The disclosed system provides a solution to these and other technical problems. In some embodiments, the disclosed system introduces determining, by the SAS that is the governing entity of a TDD-connected set, a pair of CBSDs with an edge that has the maximum distance between them compared to other pairs of CBSDs in the TDD-connected set, determining a propagation delay between the determined pair of CBSDs, determining a required guard time corresponding to the propagation delay, and communicating the required guard time to all the CBSDs in the TDD-connected set. In response, each SAS may send its respective desired TDD configuration that may comply with the required guard time to the SAS. The SAS may verify whether the received TDD configurations meet the required guard time. When the CBSDs send a grant request with a TDD configuration that meets the required guard time, the SAS may determine a common TDD configuration and transmit the common TDD configuration to the CBSDs. The CBSDs may send a grant request with the common TDD configuration to the SAS. In response, SAS may authorize the CBSDs to transmit using the common TDD configuration.

In this manner, the guard time for the TDD-connected set is determined and distributed to the CBSDs of the set. Thus, interference between CBSDs in the TDD-connected set is reduced and the network congestion as a result of interference is also reduced. With reduced interference, the network's overall performance improves. This, in turn, leads to higher quality of service (QoS), higher data rates, and reduced latency and network congestion for end-users of the UEs.

In scenarios where multiple operators are part of the same TDD-connected set (such as, a TDD-connected set comprising base stations with multiple SMOs), the disclosed system facilitates coordination between the SMOs to determine a required guard time and communicate a TDD configuration with the required guard time to the SMOs.

Thus, in such scenarios, the disclosed system further improves the overall network performance by facilitating that multiple SMOs 140 and their Open Distributed Units (O-DUs), Open Central Units (O-CUs), and Open Radio Units (O-RUs) are operating with synchronized TDD configuration. This reduces the possibility of cross-link interference, which in turn, increases the QoS, and data rates, and reduces latency and network congestion across different networks.

SAS-Coordinated TDD Configuration for CBRS

According to some embodiments, a system for determining a TDD configuration, comprises a memory operably coupled to a processor. The memory is configured to store locations of a set of base stations. The processor is configured to determine the set of base stations operating in a time division duplexing (TDD)-connected set. The processor is further configured to identify a set of pairs of base stations, wherein each pair of base stations is associated with a possibility of cross-link interference between the pair of base station. The processor is further configured to determine a distance between each identified pair of base stations based at least in part upon the locations of the each identified pair of base stations. The processor is further configured to identify, from among the set of pairs of base stations, a first pair of base stations with a first distance between the first pair of base stations, wherein the first distance is more than other determined distances between other pairs of base stations. The processor is further configured to determine a propagation delay between the identified first pair of base stations. The processor is further configured to communicate the propagation delay as a required guard time to the set of base stations. The processor is further configured to receive, from each base station from among the set of base stations, a respective TDD configuration for signal communication, wherein the respective TDD configuration is determined according to the required guard time. The processor is further configured to determine whether the respective TDD configuration meets the required guard time. The processor is further configured in response to determining that the respective TDD configuration meets the required guard time, to determine a common TDD configuration that satisfies TDD configurations of more than a threshold number of base stations from among the set of base stations. The processor is further configured to communicate the common TDD configuration to the set of base stations. The processor is further configured to receive, from at least a base station from among the set of base stations, a grant request to transmit using the common TDD configuration. The processor is further configured to authorize the base station to transmit using the common TDD configuration.

Rapp-Coordinated TDD Configuration in O-RAN

According to some embodiments, a system for configuring a TDD configuration in O-RAN comprises a set of SMO devices configured to provide SMO services as described herein. The set of SMO devices comprises a first SMO device, a second SMO device, and a governing SMO device, wherein the governing SMO device is selected to coordinate a TDD configuration among the set of SMO devices. The first SMO device comprises a first processor configured to receive a first Open Radio Unit (O-RU) antenna location information and a first O-RU deployment information from a first O-RU device. In some embodiments, the O-RU antenna location and deployment information may be provided to the governing SMO device manually by the operators of the SMO devices. The first processor is further configured to communicate the first O-RU antenna location information and deployment information to the governing SMO device. The second SMO device comprises a second processor configured to receive a second O-RU antenna location information and a second O-RU antenna deployment information from a second O-RU device. The second processor is further configured to communicate the second O-RU antenna location information and the second O-RU deployment information to the governing SMO device. The governing SMO device comprises a third processor configured to receive the first O-RU antenna location information and the first O-RU antenna deployment information from the first SMO device. The third processor is further configured to receive the second O-RU antenna location information and the second O-RU antenna deployment information from the second SMO device. The third processor is further configured to determine a distance between a first base station and a second base station antennas, wherein the first base station is associated with the first O-RU device, wherein the second base station is associated with the second O-RU device. The third processor is further configured to determine a propagation delay between the first base station and the second base station. The third processor is further configured to determine a required guard time corresponding to the determined propagation delay, wherein the required guard time indicates a required time gap between an uplink transmission and a downlink transmission for each of a set of base stations operating a TDD-connected set. The third processor is further configured to determine a recommended TDD configuration based at least in part upon the required guard time. The third processor is further configured to communicate the recommended TDD configuration to the first SMO device. The first processor is further configured to forward the recommended TDD configuration to a first Open Distributed Unit (O-DU) device associated with the first SMO device.

SAS/SMO Interference Mitigation for Remote Interference

According to some embodiments, a system for mitigating remote interference in a mobile network comprises a first SMO device comprising a memory operably coupled to a processor. The memory is configured to store information identifying a second SMO device. The processor is further configured to receive, from the second SMO device, a first message indicating that a first base station is experiencing interference from a second base station, wherein the first message comprises an aggressor set identifier (ID) identifying the second base station. The processor is further configured to identify the second base station based at least in part upon the aggressor set ID. The processor is further configured to receive, from the second SMO device, at least one recommended interference mitigation procedure to address the interference experienced by the first base station. The processor is further configured to perform a first interference mitigation procedure from among the at least one recommended interference mitigation procedure. The processor is further configured to communicate, to the second SMO device, a second message indicating that the first interference mitigation procedure has commenced.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions for mitigating interference in a network. Embodiments of the present disclosure and its advantages may be understood by referring to FIGS. 1 through 8. FIGS. 1 through 8 are used to describe systems and methods for mitigating interference in a network, according to certain embodiments of the present disclosure.

System Overview

Figure 1:
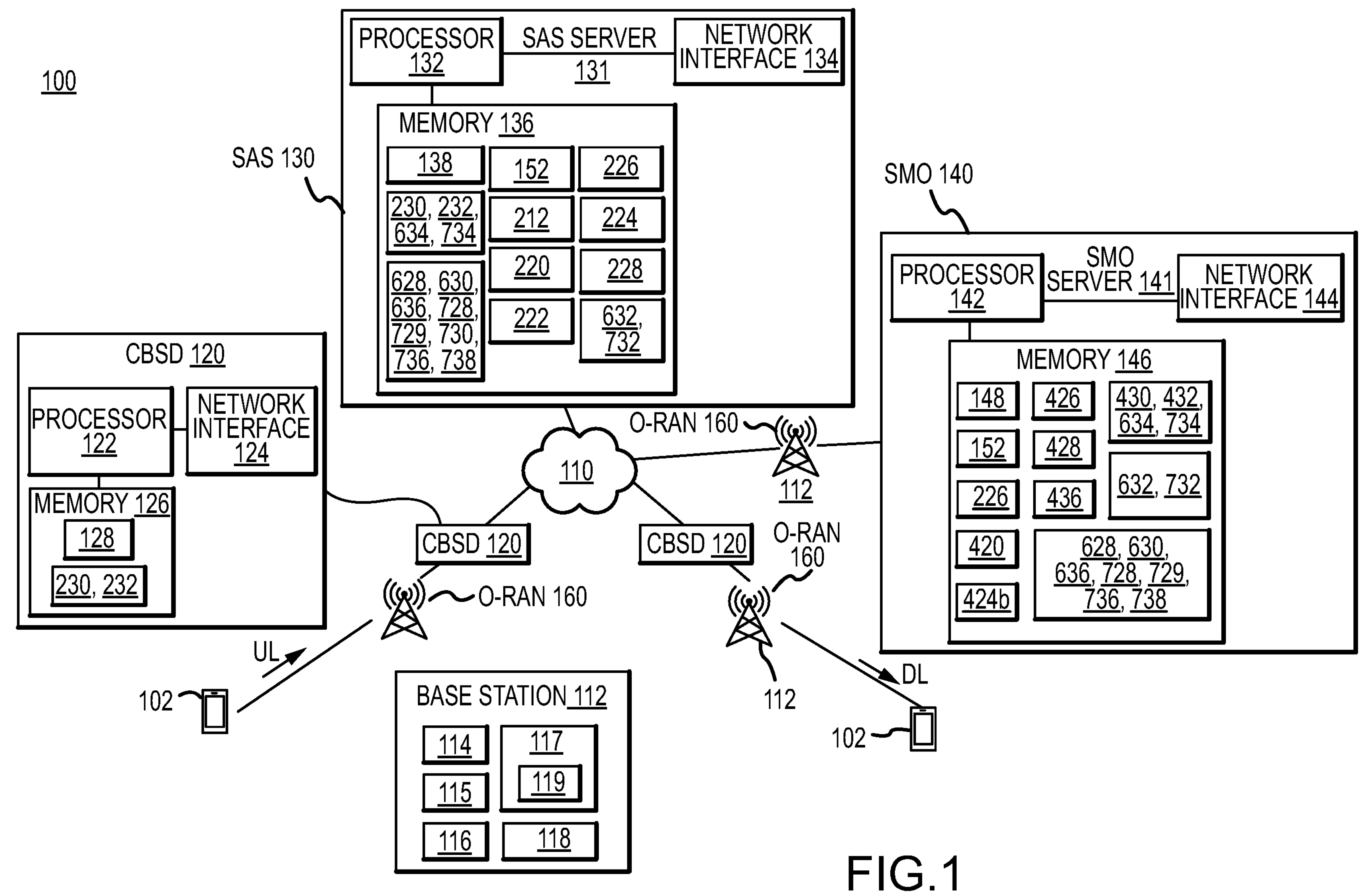
FIG. 1 illustrates an embodiment of a system configured to detect and mitigate interference in a network.

FIG. 1 illustrates an embodiment of a communication system 100 that is generally configured to mitigate interference among base stations. In some embodiments, the system 100 comprises one or more User Equipment (UEs) 102, one or more base stations 112, one or more Citizens Broadband Radio Service Devices (CBSDs) 120, one or more Spectrum Access Systems (SASs) 130, one or more SAS servers 131, one or more Service Management and Orchestration (SMOs) 140, one or more SMOs servers 141, communicatively coupled with one another via a network 110. The network 110 enables the communication among the components of the system 100. Each base station 112 may be configured to operate in the Open Radio Access Network (O-RAN) 160 architecture. The CBSDs 120 are configured to communicate signals in Citizen Broadband Radio Service (CBRS) band with UEs 102. Each SAS 130 may include and/or be associated with computing device(s), such as a network of SAS servers 131, and the like. The SAS 130 may be a centralized system that is generally configured to manage the spectrum in the CBRS band. The SMO 140 is a network component in the O-RAN architecture and is generally configured to oversee various network functions and facilitate the management, orchestration, and coordination of services across the network. Each SMO 140 may include and/or be associated with computing device(s), such as a network of SMO servers 131, and the like. Each SMO 140 may ack as a network node/function within the O-RAN architecture 160. Each SMO 140 may be configured to manage and orchestrate various aspects of the RAN operations, such as coordination among different RAN components, including Open Distributed Units (O-DUs), Open Central Units (O-CUs), and Open Radio Units (O-RUs). These components are described in FIG. 4. In other embodiments, system 100 may not have all of the components listed and/or may have other elements instead of, or in addition to, those listed above.

In general, the system 100 improves the interference mitigation techniques and thus the functioning of network nodes that experience network interference. In the existing systems, there is a challenge in synchronizing Time Division Duplexing (TDD) configurations among CBSDs 120 that are within the same TDD-connected set. The guard time between uplink and downlink transmissions from different CBSDs 120 is to be set in a TDD configuration. If a first CBSD 120 starts transmitting an downlink signal, and meanwhile, a second CBSD 120 is in receiving mode before the guard time is ended, the second CBSD 120 may experience cross-link interference from the first CBSD 120. Within a TDD-connected set, different pairs of CBSDs 120 may have different distances from each other. This causes the in-flight delays between pairs of CBSDs 120 to vary, which, in turn, causes the propagation delay between pairs of CBSDs 120 to vary. In the current system, the in-flight delay between a pair of CBSDs 120 is not accounted for in determining a TDD configuration.

In the current systems, the individual CBSDs 120 or their managing schedulers may not have the necessary information about the distances to other CBSDs 120, particularly those operated by different Mobile Network Operators (MNOs), to set the guard time independently. Moreover, there is currently no system for sharing distance information among different RAN deployments, which aggravates the problem when CBSDs 120 within the same TDD-connected set are managed by different entities, e.g., different SMOs 140.

Furthermore, in the current systems, the CBSDs 120, in a TDD-connected set, are not aware of the required guard time to synchronize their uplink and downlink transmissions. Thus, the CBSDs 120 are not able to automatically update or adjust their TDD configuration to mitigate possible, anticipated, and/or experienced cross-link interferences. This leads to degraded performance of CBSDs 120, network interference, network congestion, and overall poor network communication among the UEs 102 and CBSDs 120. Similar problems exist for cases in O-RAN where SMOs 140 manage the orchestration and service management of RAN elements but lack a system-wide approach to coordinate the operational parameters, such as guard time, across different administrative domains.

The disclosed system 100 provides a solution to these and other technical problems. In some embodiments, the system 100 introduces determining, by the SAS 130 that is the governing entity of a TDD-connected set (see an example of a TDD-connected set 210 in FIG. 2), a pair of CBSDs 120 with an edge that has the maximum distance between them compared to other pairs of CBSDs 120 in the TDD-connected set, determining a propagation delay between the determined pair of CBSDs 120, determining a required guard time corresponding to the propagation delay, and communicating the required guard time to all the CBSDs 120 in the TDD-connected set. In response, each SAS 130 may send its respective desired TDD configuration that may comply with the required guard time to the SAS 130. The SAS 130 may verify whether the received TDD configurations meet the required guard time. When the CBSDs 120 send a grant request with a TDD configuration that meets the required guard time, the SAS 130 may determine a common TDD configuration and transmit the common TDD configuration to the CBSDs 120. The CBSDs 120 may send a grant request with the common TDD configuration to the SAS 130. In response, SAS 130 may authorize the CBSDs 120 to transmit using the common TDD configuration.

In this manner, the guard time for the TDD-connected set is determined and distributed to the CBSDs 120 of the set. Thus, interference between CBSDs 120 in the TDD-connected set is reduced and the network congestion as a result of interference is also reduced. With reduced interference, the network's overall performance improves. This, in turn, leads to higher quality of service (QoS), higher data rates, and reduced latency and network congestion for end-users of the UEs 102.

In scenarios where multiple operators are part of the same TDD-connected set (such as multiple SMOs 140), the system 100 facilitates coordination between the SMOs 140 to determine a required guard time and communicate a TDD configuration with the required guard time to the SMOs 140.

Thus, in such scenarios, the system 100 further improves the overall network performance by facilitating that multiple SMOs 140 and their O-RUs, O-DUs, and O-CUs are operating with a synchronized TDD configuration. This reduces the possibility of cross-link interference, which in turn, increases the QoS, and data rates, and reduces latency and network congestion across different networks.

System Components

Example UE

A UE 102 may generally be any network device that is configured to communicate data with the base station 112. The UE 102 may be operated by a user. Some examples of the UE 102 may include, but are not limited to, computing devices, smartphones, tablets, notebook computers, mobile devices, sensors, vehicles, autonomous vehicles, machinery, appliances, smart speakers, digital assistants, security cameras, monitoring devices, home electronics, media players, receiving devices, set-top boxes, other computing devices and IoT devices, etc. The UE 102 may be operated by a user and communicate with other devices connected to the network 110 and/or base station 112. The UE 102 may be a long-term evolution (LTE) component, $4^{th}$ generation (4G), $5^{th}$ generation (5G), new radio (NR) 5G component.

The UE 102 may include a hardware processor, memory, and/or circuitry (not explicitly shown) configured to perform any of the functions or actions of the UE 102 described herein. For example, a software application designed using software code may be stored in the memory and executed by the processor to perform the functions of the UE 102. The UE 102 is configured to communicate with other devices and components of the system 100 via the base stations 112 (e.g., CBSDs 120 and/or SMOs 140, etc.). A user may use the UE 102 to access the internet, for example, via the network 110.

Example Network

Network 110, in general, may be a wide area network (WAN), a personal area network (PAN), a cellular network, or any other technology that allows devices to communicate electronically with other devices. In one or more embodiments, the network 170 may be the Internet. The network 110 may be any suitable type of wireless and/or wired network. The network 110 may be a combination of one or more public and/or private networks, including a local area network (LAN), a metropolitan area network (MAN), a WAN, and the like.

Example Base Station

Base station 112 may be a network node, an access point, an NB, an eNB, eNodeB, gNB or other types of wireless access points, and is generally configured to enable wireless communication between the UE 102 and other components of the system 100. The base station 112 may serve communication to devices within a serving cell that defines a corresponding coverage area of the serving cell. The base station 112 may be a serving base station for UE(s) 102, user devices, mobile devices, collectively referred to herein as UEs 102. When a UE 102 is within a coverage area associated with a particular base station 112, the base station 112 provides communication coverage to the UE 102. For example, when the UE 102 comes into the cell associated with the base station 112, the UE 102 may communicate with the base station 112 by transmitting uplink (UL) to the base station 112 and receive a downlink (DL) from the base station 112. As the UE 102 travels between cells, the base stations 112 performs the handover procedure to hand over facilitating the communication of the UE 102 with other devices.

In certain embodiments, the base station 112 may be configured to facilitate cellular networks, 4G, 5G, NR 5G, 3GPP, and other wireless protocols. In certain embodiments, the base station 112 may also include a transceiver 114, a transmission filter 115, a receiving filter 116, memory resources, including a memory 117, and processing resources, including a processor 118 to facilitate operations of the base station 112, such as to transmit and receive mobile communication signals, and/or any other signals. For example, the transceiver 114 may include processing circuitry configured to transmit signals (e.g., mobile communication signals) to UEs 102, other base stations 112, and other communication systems to enable mobile communication and access to the network 110. The transmission filter 115 includes a bandpass filter with a strict passband. The passband corresponds to the bandwidth that is assigned for the base station 112. Any signals with frequencies outside the passband are filtered so that they are not transmitted from the base station 112. The receiving filter 116 includes a bandpass filter configured to ensure that the base station 112 will reject any signals outside of its designated bandwidth. Accordingly, the receiving filter 116 is a bandpass filter with a strict bandpass corresponding to the assigned bandwidth of the base station 112. The memory resources 117 include one or more computer-readable media that store software instructions for establishing a mobile communication network with the base station 112. The processing resources 118 may include one or more processors, and processing circuitries configured to execute the software instructions 119 stored in the one or more computer-readable media of the memory resources 117 to perform wireless communication functions of the base station 112.

Example CBSD

A CBSD 120 is generally a base station that is configured to operate in a CBRS band which ranges from 3.5 to 3.7 Giga Hertz (GHz). Each CBSD 120 may be associated with and/or an example of a base station 112. The CBSD 120 is configured to provide wireless connectivity to a shared spectrum environment. For example, the CBSD 120 may provide coverage to UEs in cells, and fixed wireless access points that provide broadband services to homes and buildings, among others. In some embodiments, the CBSDs 120 may be managed by a SAS 130 which dynamically assigns communication channels, frequency bands, and power levels to the CBSDs 120 to utilize the CBRS frequency band and reduce interference between the CBSDs 120.

The CBSD 120 may be formed by one or more physical devices configured to provide services and resources (e.g., data and/or hardware resources) for the components of the system 100. For example, each CBSD 120 may provide a respective desired TDD configuration to a SAS server 131, where the TDD configuration is determined based on the network traffic requirements of CBSDs 120 in a TDD-connected set, a required guard time provided by the SAS 130, among other factors.

The CBSD 120 comprises a processor 122 operably coupled with a network interface 124 and a memory 126. Processor 122 may include one or more specialized and/or general-purpose processors configured to perform one or more operations of the CBSD 120 described herein. For example, the processor may be implemented by a special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. It should be understood that the functions performed by various components of FIG. 1 may be performed using one or more processors. As such, for example, functions of the CBSD 120 may be performed by the processor 122 executing the software instructions 128. The processor 122 is configured to operate as described in FIGS. 1-8. For example, the processor 122 may be configured to perform one or more operations of the operational flow 200 described in FIG. 2 and one or more operations of the method 300 as described in FIG. 3, or any other operation described herein.

Network interface 124 is configured to enable wired and/or wireless communications. The network interface 124 communicatively couples the CBSD 120 to other devices, such as some or all of the components of the system 100. The network interface 124 may communicate over any type of network topology and communication link.

The network interface 124 may comprise one or more antennas as part of a transceiver, a receiver, or a transmitter for communicating using one or more wireless communication protocols or technologies. In some embodiments, the network interface 124 may be configured to communicate using, for example, New Radio (NR) and/or Long Term Evolution (LTE) using at least some shared radio components. In some embodiments, the network interface 124 may be configured to communicate using single or shared Radio Frequency (RF) bands. The RF bands may be coupled to a single antenna, or may be coupled to multiple antennas (e.g., for a multiple-input multiple output (MIMO) configuration) to perform wireless communications. The network interface 124 may be configured to comprise one or more peripherals such as a network interface, one or more administrator interfaces, and one or more displays.

The network interface 124 may be any suitable hardware or software (e.g., executed by hardware) to facilitate any suitable type of communication in wireless or wired connections. These connections may comprise, but not be limited to, all or a portion of network connections coupled to additional network components in the network 110, RAN, O-RAN 160, UEs 102, the Internet, an Intranet, a private network, a public network, a peer-to-peer network, the public switched telephone network, a cellular network, a LAN, a MAN, a WAN, and a satellite network. The server network interface may be configured to support any suitable type of communication protocol.

The network interface 124 is configured to transmit and receive data from and to other devices, for example, the network interface 124 may include a wireless fidelity (WiFi) modem, a WiFi interface, a fifth generation (5G) modem, a 5G interface, a NR 5G modem, a NR 5G interface, a fourth generation (4G) modem, a 4G interface, a LTE modem, a LTE interface, a LAN modem, a LAN interface, a MAN modem, a MAN interface, a WAN modem, WAN interface, and any other suitable type of communication protocol.

The memory 126 may include a machine-readable medium having stored thereon instructions which may be used to program a computer (or other electronic devices) to perform a process. The machine-readable medium may include, but is not limited to, floppy diskettes, optical disks, compact disc read-only memories (CDROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions and data. The memory 126 may store any of the information described in FIGS. 1-8 along with any other data, instructions, logic, rules, or code operable to implement the function(s) described herein when executed by processor 122. For example, the memory 126 may store software instructions 128, TDD configuration 230, 232, and/or any other data and instructions described herein. The software instructions 128 may comprise any suitable set of instructions, logic, rules, or code operable to execute the operations of processor 122 and perform the functions described herein, such as some or all of those described in FIGS. 1-8.

SAS

A SAS 130 is a Federal Communication Commission (FCC)-mandated function that is responsible to and configured to manage the CBSDs 120 spectrum usage and allocating channels to CBSDs 120 upon request. The SAS 130 may be the governing entity that facilitates FCC compliance of all devices (e.g., CBSDs 120) to operate in the CBRS spectrum. The SAS 130 may perform other functions as understood by one of ordinary skill in the art. In some embodiments, the SAS 130 may be implemented with one or more processors in one or more physical computing devices, such as SAS servers 131. In some embodiments, the SAS 130 may be implemented in a cloud environment. In some embodiments, the SAS 130 may be implemented in one or more SAS servers 131. In some embodiments, the SAS 130 may be implemented in one or more base stations (e.g., base stations 112). In certain embodiments, the SAS 130 may be implemented by a cluster of computing devices located in a server farm. For example, the SAS 130 may be implemented by a plurality of SAS servers 131 using distributed computing and/or cloud computing systems in a network. In certain embodiments, the SAS 130 may be implemented by a plurality of computing devices in one or more data centers. The SAS 130 may be formed by one or more physical devices configured to provide services and resources (e.g., data and/or hardware resources) for the components of the system 100.

The SAS server 131 comprises a processor 132 operably coupled with a network interface 134 and a memory 136. Processor 132 may include one or more specialized and/or general-purpose processors configured to perform one or more operations of the SAS server 131 described herein. For example, the processor may be implemented by a special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. It should be understood that the functions performed by various components of FIG. 1 may be performed using one or more processors. As such, for example, functions of the SAS server 131 may be performed by the processor 132 executing the software instructions 138. The processor 132 is configured to operate as described in FIGS. 1-8. For example, the processor 132 may be configured to perform one or more operations of the operational flow 200 described in FIG. 2, one or more operations of the method 300 described in FIG. 3, one or more operations of the operational flow 400 described in FIG. 4, one or more operations of the method 500, one or more operations of the operational flow 600 described in FIG. 6, one or more operations of the operational flow 700 described in FIG. 7, and one or more operations of the method 800 as described in FIG. 8, or any other operation described herein.

Network interface 134 is configured to enable wired and/or wireless communications. The network interface 134 communicatively couples the SAS server 131 to other devices, such as some or all of the components of the system 100. The network interface 134 may communicate over any type of network topology and communication link.

The network interface 134 may comprise one or more antennas as part of a transceiver, a receiver, or a transmitter for communicating using one or more wireless communication protocols or technologies. In some embodiments, the network interface 134 may be configured to communicate using, for example, NR and/or LTE using at least some shared radio components. In some embodiments, the network interface 134 may be configured to communicate using single or shared RF bands. The RF bands may be coupled to a single antenna, or may be coupled to multiple antennas (e.g., for a MIMO configuration) to perform wireless communications. The network interface 134 may be configured to comprise one or more peripherals such as a network interface, one or more administrator interfaces, and one or more displays.

The network interface 134 may be any suitable hardware or software (e.g., executed by hardware) to facilitate any suitable type of communication in wireless or wired connections. These connections may comprise, but not be limited to, all or a portion of network connections coupled to additional network components in the network 110, RAN, O-RAN 160, UEs 102, the Internet, an Intranet, a private network, a public network, a peer-to-peer network, the public switched telephone network, a cellular network, a LAN, a MAN, a WAN, and a satellite network. The server network interface may be configured to support any suitable type of communication protocol.

The network interface 134 is configured to transmit and receive data from and to other devices, for example, the network interface 134 may include a WiFi modem, a WiFi interface, a 5G modem, a 5G interface, a NR 5G modem, a NR 5G interface, a fourth generation (4G) modem, a 4G interface, a LTE modem, a LTE interface, a LAN modem, a LAN interface, a MAN modem, a MAN interface, a WAN modem, WAN interface, and any other suitable type of communication protocol.

The memory 136 may include a machine-readable medium having stored thereon instructions which may be used to program a computer (or other electronic devices) to perform a process. The machine-readable medium may include, but is not limited to, floppy diskettes, optical disks, CDROMs, magneto-optical disks, ROMs, RAMs, EPROMs, EEPROMs, magnetic or optical cards, flash memory, or other type of media/machine-readable medium suitable for storing electronic instructions and data. The memory 136 may store any of the information described in FIGS. 1-8 along with any other data, instructions, logic, rules, or code operable to implement the function(s) described herein when executed by processor 132. For example, the memory 136 may store software instructions 138, identifiers 152, TDD configuration 230, 232, 634, 734, CBRS locations 212, propagation delay 222, propagation models 226, distances 220, required guard time 228, CBSD deployment information 224, messages 628, 630, 636, 728, 729, 730, 736, 738, interference mitigation procedures 632, 732, and/or any other data or instructions. The software instructions 138 may comprise any suitable set of instructions, logic, rules, or code operable to execute the operations of processor 132 and perform the functions described herein, such as some or all of those described in FIGS. 1-8. The identifiers 152 include information identifying SAS servers 131, information identifying SMO servers 141, information identifying CBSDS 120, information identifying base stations 112 (e.g., victim base station 620 (see FIG. 6) and victim base station 720 (see FIG. 7) and aggressor base station 622 (see FIG. 6) and victim base station 722 (see FIG. 7)), among others.

SMO

The SMO 140 may be a component in O-RAN 160 architecture and is generally configured to facilitate the management and orchestration of network elements within the O-RAN 160 and provide SMO services as described herein. In some embodiments, the SMO 140 may provide control for configuring, managing, and improving the O-RAN 160. In some embodiments, the SMO 140 may be implemented in one or more network data centers, cloud environment, and/or as a part of network operation centers (NOCs). In some embodiments, the SMO 140 may be implemented in one or more SMO servers 141. In some embodiments, the SMO 140 may be implemented in one or more base stations (e.g., base stations 112). In certain embodiments, the SMO 140 may be implemented by a cluster of computing devices located in a server farm. For example, the SMO 140 may be implemented by a plurality of servers 141 using distributed computing and/or cloud computing systems in a network. In certain embodiments, the SMO 140 may be implemented by a plurality of computing devices in one or more data centers. The SMO 140 may be formed by one or more physical devices configured to provide services and resources (e.g., data and/or hardware resources) for the components of the system 100.

In O-RAN network, the SMO 140 may manage and configure O-RAN elements, such as O-CU, O-DU, and O-RU. The SMO 140 may be configured to allocate network resources to O-RAN elements to facilitate deployment of RAN functions and services based on network conditions, user demands, and operator policies. The SMO 140 may perform other functions as understood by one of ordinary skill in the art.

The SMO server 141 comprises a processor 142 operably coupled with a network interface 144 and a memory 146. Processor 142 may include one or more specialized and/or general-purpose processors configured to perform one or more operations of the SMO server 141 described herein. For example, the processor may be implemented by a special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. It should be understood that the functions performed by various components of FIG. 1 may be performed using one or more processors. As such, for example, functions of the SMO server 141 may be performed by the processor 142 executing the software instructions 148. The processor 142 is configured to operate as described in FIGS. 1-8. For example, the processor 142 may be configured to perform one or more operations of the operational flow 200 described in FIG. 2, one or more operations of the method 300 described in FIG. 3, one or more operations of the operational flow 400 described in FIG. 4, one or more operations of the method 500, one or more operations of the operational flow 600 described in FIG. 6, one or more operations of the operational flow 700 described in FIG. 7, and one or more operations of the method 800 as described in FIG. 8, or any other operation described herein.

Network interface 144 is configured to enable wired and/or wireless communications. The network interface 144 communicatively couples the SMO server 141 to other devices, such as some or all of the components of the system 100. The network interface 144 may communicate over any type of network topology and communication link.

The network interface 144 may comprise one or more antennas as part of a transceiver, a receiver, or a transmitter for communicating using one or more wireless communication protocols or technologies. In some embodiments, the network interface 144 may be configured to communicate using, for example, NR and/or LTE using at least some shared radio components. In some embodiments, the network interface 144 may be configured to communicate using single or shared RF bands. The RF bands may be coupled to a single antenna, or may be coupled to multiple antennas (e.g., for a MIMO configuration) to perform wireless communications. The network interface 144 may be configured to comprise one or more peripherals such as a network interface, one or more administrator interfaces, and one or more displays.

The network interface 144 may be any suitable hardware or software (e.g., executed by hardware) to facilitate any suitable type of communication in wireless or wired connections. These connections may comprise, but not be limited to, all or a portion of network connections coupled to additional network components in the network 110, RAN, O-RAN 160, UEs 102, the Internet, an Intranet, a private network, a public network, a peer-to-peer network, the public switched telephone network, a cellular network, a LAN, a MAN, a WAN, and a satellite network. The server network interface may be configured to support any suitable type of communication protocol.

The network interface 144 is configured to transmit and receive data from and to other devices, for example, the network interface 144 may include a WiFi modem, a WiFi interface, a 5G modem, a 5G interface, a NR 5G modem, a NR 5G interface, a 4G modem, a 4G interface, a LTE modem, a LTE interface, a LAN modem, a LAN interface, a MAN modem, a MAN interface, a WAN modem, WAN interface, and any other suitable type of communication protocol.

The memory 146 may include a machine-readable medium having stored thereon instructions which may be used to program a computer (or other electronic devices) to perform a process. The machine-readable medium may include, but is not limited to, floppy diskettes, optical disks, CDROMs, magneto-optical disks, ROMs, RAMs, EPROMs, EEPROMs, magnetic or optical cards, flash memory, or other type of media/machine-readable medium suitable for storing electronic instructions and data. The memory 146 may store any of the information described in FIGS. 1-8 along with any other data, instructions, logic, rules, or code operable to implement the function(s) described herein when executed by processor 142. For example, the memory 146 may store software instructions 148, identifiers 152, rAPP 420, O-RU antenna location information and deployment information 424, distances 436, TDD configurations 230, 232, 634, 734, propagation delay 426, required guard time 428, propagation models 226, messages 628, 630, 636, 728, 729, 730, 736, 738, interference mitigation procedures 632, 732, and/or any other data or instructions described herein. The software instructions 148 may comprise any suitable set of instructions, logic, rules, or code operable to execute the operations of processor 142 and perform the functions described herein, such as some or all of those described in FIGS. 1-8. The identifiers 152 include information identifying SAS servers 131, information identifying SMO servers 141, information identifying CBSDS 120, information identifying base stations 112 (e.g., victim base station 620 (see FIG. 6) and victim base station 720 (see FIG. 7) and aggressor base station 622 (see FIG. 6) and victim base station 722 (see FIG. 7)), among others.

Figure 2:
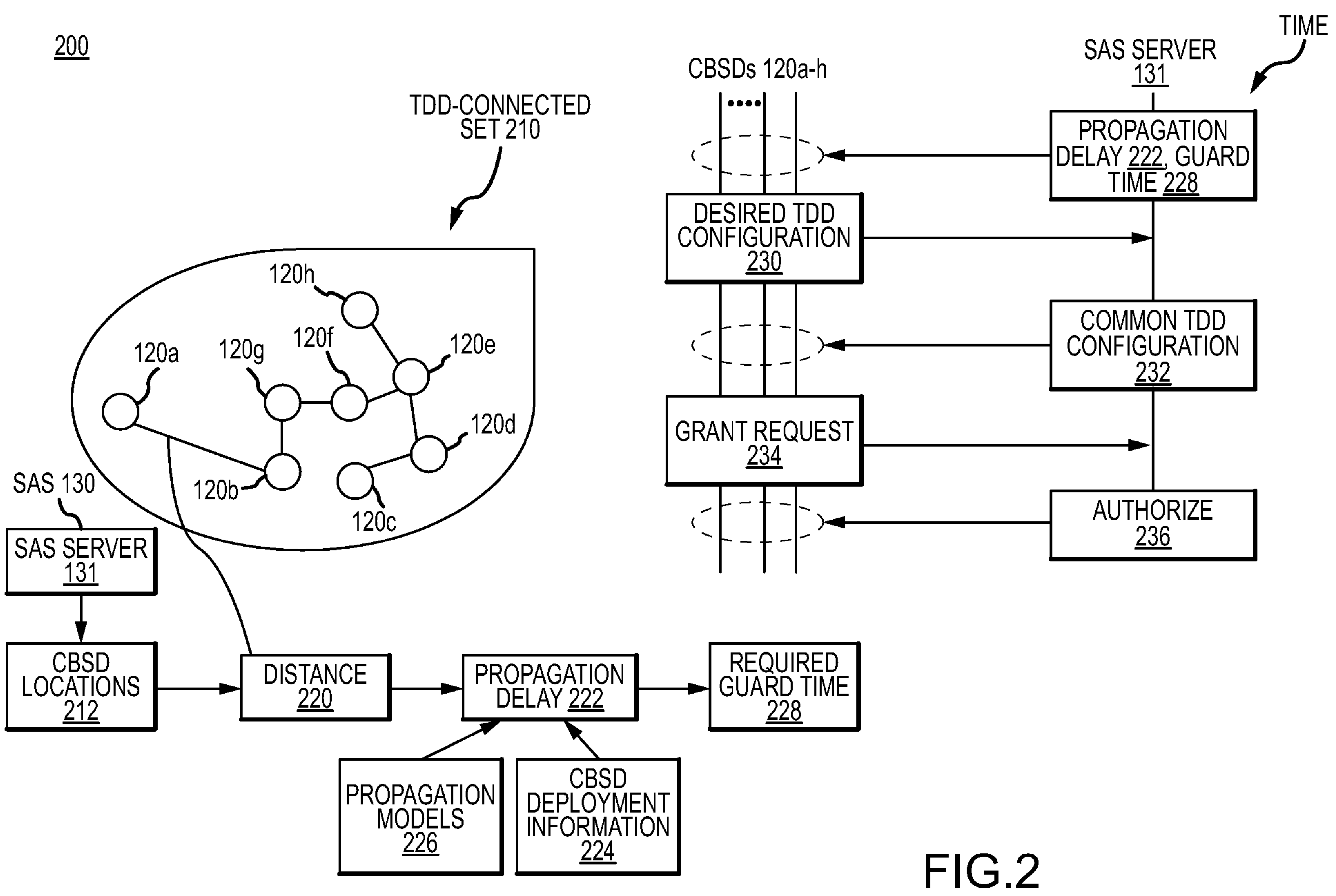
FIG. 2 illustrates an example operational flow of the system 100 of FIG. 1 for implementing a Spectrum Access System (SAS)-coordinated Time Division Duplexing (TDD) configuration for a TDD-connected set.

Operational Flow for Determining TDD Configuration for CBSDs in a TDD-Connected Set FIG. 2 illustrates an example operational flow 200 of system 100 (see FIG. 1) for determining a TDD configuration for CBSDs 120 in a TDD-connected set 210. The TDD-connected set 210 may refer to a set of base stations or ratio access nodes that utilize Time Division Duplexing (TDD) for network operations. In embodiments where devices operate in the CBRS spectrum in a network, a group of CBSDs 120 that utilize TDD for network operations may be referred to as a TDD-connected set 210. The CBSDs 120 in the TDD-connected set 210 may be configured to have a synchronized signal transmission with their respective UEs.

In TDD networks, communication between a CBSD 120 and UEs may occur over the same frequency by separated in time, where time slots are alternated for uplink and downlink transmissions. For example, within a TDD-connected set 210, the CBSDs 120 may want to allocate certain time slots for uplink transmission and allocate other certain time slots for downlink transmission. A time gap dedicated to being between the time slots for uplink and time slots for downlink transmissions is referred to as a guard time. The guard time is set to facilitate that uplink and downlink transmissions do not overlap and interfere with each other. The guard time may be desired to account for a transceiver switch between transmitting and receiving modes and a propagation delay between CBSDs 120 in a TDD-connected set 210. The guard time may depend on a distance between each pair of CBSDs 120 with an edge. In TDD systems, a pair of CBSDs 120 with an edge is a terminology that may refer to a pair of CBSDs 120 with a possibility of cross-link interference between them.

In the example of FIG. 2, each line, or edge, between each pair of CBSDs 120 represents a possibility of cross-link interference between the respective pair of CBSDs 120. For example, each pair of CBSDs **120*a* and 120*b*, CBSDs 120*c* and 120*d*, CBSDs 120*a* and 120*e*, CBSDs 120*e* and 120*f*, CBSDs 120*f* and 120*g*, and CBSDs 120*e* and 120*h* has a line between them which represents a possibility of cross-link interference between the respective pair of CBSDs 120. In a TDD-connected set 210, the distance between a pair of CBSDs 120 with an edge impacts the propagation delay between these two CBSDs 120, and therefore, the guard time. For example, the farther a pair of CBSDs 120 are from each other, the longer the signal takes to travel from one CBSD 120 to the other. Therefore, the propagation delay for this pair of CBSDs 120 is larger compared to another pair of CBSDs 120** that are closer together.

In the example of FIG. 2, the TDD-connected set 210 includes CBSDs **120*a* to 120*h*. Each CBSD 120*a* to 120*h* is an instance of CBSD 120 described in FIG. 1. The CBSDs 120*a* to 120*h* in the TDD-connected set 210 are managed by SAS 130 that may be implemented in one or more SAS servers 131**.

In operation, the SAS server 131 may determine the set of CBSDs 120 that are in the TDD-connected set 210. In this process, in some embodiments, the SAS server 131 may obtain the CBSD location 212 associated with each CBSD **120*a* to 120*h*. For example, the SAS server 131 may store the CBRS locations 212 of the CBSDs 120*a* to 120*h* in a memory 136 (see FIG. 1). In the same or another example, the SAS server 131 may receive the location and deployment information of each CBSD 120***a* to 120*h* by receiving the information when the CBSDs 120*a* to 120*h* register with the SAS.

In some embodiments, the SAS 130 (and SAS server 131) may be provided with information about terrain, location environment, and the like. In some embodiments, the SAS 130 (and the SAS server 131) may determine the set of CBSDs 120 in the TDD-connected set 210 based on a combination of geographical proximity, CBSD locations 212, terrain, location environment, and the like. In some embodiments, the SAS 130 (and SAS server 131) may identify the set of CBSDs 120 in the TDD-connected set 210 based on a predefined area or threshold distance (e.g., 200 kilometers, 300 kilometers, etc.). In some embodiments, the SAS 130 (and SAS server 131) may identify the set of CBSDs 120 in the TDD-connected set 210 based on operational parameters of the CBSDs 120, such as frequency bands, power levels, uplink and downlink patterns, antenna highest, azimuth and radiation pattern, among others.

In response to identifying the set of CBSDs 120 in the TDD-connected set 210, the SAS server 131 may identify each pair of CBSDs 120 with an edge between them. In other words, the SAS server 131 may identify each pair of CBSDs 120 associated with a possibility of cross-link interference between the pair of CBSDs 120. For example, the SAS server 131 may identify which pairs of CBSDs 120 have direct communication with each other, have overlapping coverage areas, have overlapping frequency bands, and/or are located within a threshold proximity from each other such that their signal transmissions could interfere with each other.

In the example of FIG. 2, the SAS server 131 may identify that each pair of CBSDs 120*a* and 120*b*, CBSDs 120*c* and 120*d*, CBSDs 120*a* and 120*e*, CBSDs 120*e* and 120*f*, CBSDs 120*f* and 120*g*, and CBSDs 120*e* and 120*h* is associated with a possibility of cross-link interference between them.

Determining a Propagation Delay Between a Pair of CBSDs

In response to identifying the set of pairs of CBSDs 120 with an edge, the SAS server 131 may proceed to determine a distance between each of the pairs of CBSDs 120 and determine which pair from the identified pairs of CBSDs 120 has a distance between them that is more than the distance between CBSDs 120 in other pairs of CBSDs 120. In the example of FIG. 2, the SAS server 131 may determine the distance between each of the pairs of CBSDs 120*a* and 120*b*, CBSDs 120*c* and 120*d*, CBSDs 120*a* and 120*e*, CBSDs 120*e* and 120*f*, CBSDs 120*f* and 120*g*, and CBSDs 120*e* and 120*h*. In the present disclosure, when a CBSD location of a CBSD 120 is mentioned, the CBSD location may refer to a location of the CBSD antenna associated with the CBSD 120. In some cases, a CBSD antenna may be integrated with the Radio Unit (RU) associated with the CBSD 120. In other cases, a CBSD antenna may be separate from the RU and connected to the network 110 via a radio frequency cable. Thus, in some embodiments, a distance 220 between two CBSDs 120 may represent the distance 220 between the CBSD antennas associated with the two CBSDs 120.

In response, the SAS server 131 may compare the distances 220 with each other. In the example of FIG. 2, the distance 220 between the CBSDs 120*a* and 120*b* is the largest distance among all the distances between pairs of CBSDs 120 with an edge. Therefore, the SAS server 131 may determine that the pair of CBSDs 120*a* and 120*b* has a larger distance between them compared to the other distances between other pairs. In response, the SAS server 131 may determine a propagation delay 222 between the CBSDs 120*a* and 120*b*. In this process, the SAS server 131 may simulate signal communication between the CBSDs 120*a* and 120*b* based on base station (CBSD) deployment information 224 and signal propagation models 226. For example, the base station (CBSD) deployment information 224 may include antenna patterns, propagation patterns, antenna height, antenna direction (including azimuth direction, and down-tilt direction, among other aspects of the antenna direction), transmitting power, frequency band, operational mode, location, device type (e.g., low-power, high-power), among others.

The signal propagation models 226 may include any mathematical algorithm that is configured to predict radio wave propagation patterns in space from a transmitter to a receiver. For example, a signal propagation model 226 may be configured to predict a radio wave propagation pattern by accounting for frequency, terrain conditions, environment conditions, obstacles, coverage area, and signal strength, among others. The signal propagation models 226*a* may be implemented by a processor (e.g., processor 132, 142) executing software instructions (e.g., software instructions 138, 148), respectively.

Determining a TDD Configuration

Based on the propagation delay 222, the SAS server 131 may determine the time delay corresponding to the propagation delay 222 of the largest distance 220 for cross-link interference. The propagation delay 222 may be designated as the required guard time 228. In response to determining the required guard time 228, the SAS server 131 may communicate the propagation delay 222 (as the required guard time 228) to the CBSDs 120*a* to 120*h* in the TDD-connected set 210. For example, the SAS server 131 may communicate the propagation delay 222 to the RAN scheduler of each CBSD 120*a* to 120*h*. The RAN scheduler may be a component in the CBSD 120 and configured to allocate radio resources to UEs connected to the network, manage the distribution of time slots (in TDD systems) or frequency resources (in Frequency Division Duplexing (FDD) systems), and assign transmission power levels to signal transmissions.

In response, each CBSD 120*a-h* may determine a respective desired TDD configuration 230 for signal communication based on the received required guard time 228 and respective network traffic demand of the respective CBSD 120*a-h*. In some embodiments, the respective TDD configuration 230 of a CBSD 120*a-h* may include a ratio of downlink-to-uplink communication of the CBSD 120*a-h*, the guard time, etc. Each CBSD 120*a-h* may send the respective desired TDD configuration 230 to the SAS server 131 in a grant request message.

Upon receiving the set of TDD configuration 230 requests, the SAS server 131 may verify whether each TDD configuration 230 meets the required guard time 228. If it is determined that a TDD configuration 230 request received from a particular CBSD 120 does not meet the required guard time 228, the SAS server 131 may reject the request and resend the required guard time 228 to the particular CBSD 120. Alternatively or additionally, the SAS server 131 may recommend to the particular CBSD 120 to lower the transmitting power from an interfering cell/CBSD 120 to reduce the cross-link interference. If it is determined that the requests for the TDD configurations 230 meet the required guard time 228, the SAS server 131 may determine a recommended/common TDD configuration 232 for the CBSDs 120*a-h*.

In some embodiments, the common TDD configuration 232 may be determined to satisfy the requests for the desired TDD configurations 230 of more than a threshold number (e.g., more than 80%, 90%, etc.) of the CBSDs 120*a-h*. In some embodiments, the common TDD configuration 232 may be determined to satisfy a majority (e.g., more than a threshold number of requests) of downlink-to-uplink ratios requested by the CBSDs 120*a-h*. In some embodiments, the common TDD configuration 232 may be determined to satisfy a midway (e.g., an average or median) of downlink-to-uplink ratios requested by the CBSDs 120*a-h*.

In response to determining the common TDD configuration 232, the SAS server 131 may communicate the common TDD configuration 232 to the CBSDs 120*a-h* as the recommended TDD configuration. In response, the CBSDs 120 may send a grant request 234 to transmit and receive signals using the common TDD configuration 232 to the SAS server 131. The SAS server 131 may authorize the CBSDs 120 to use the common TDD configuration 232 and transmit and receive signals using the common TDD configuration 232.

Method for Determining TDD Configuration for CBSDs in a TDD-Connected Set

Figure 3:
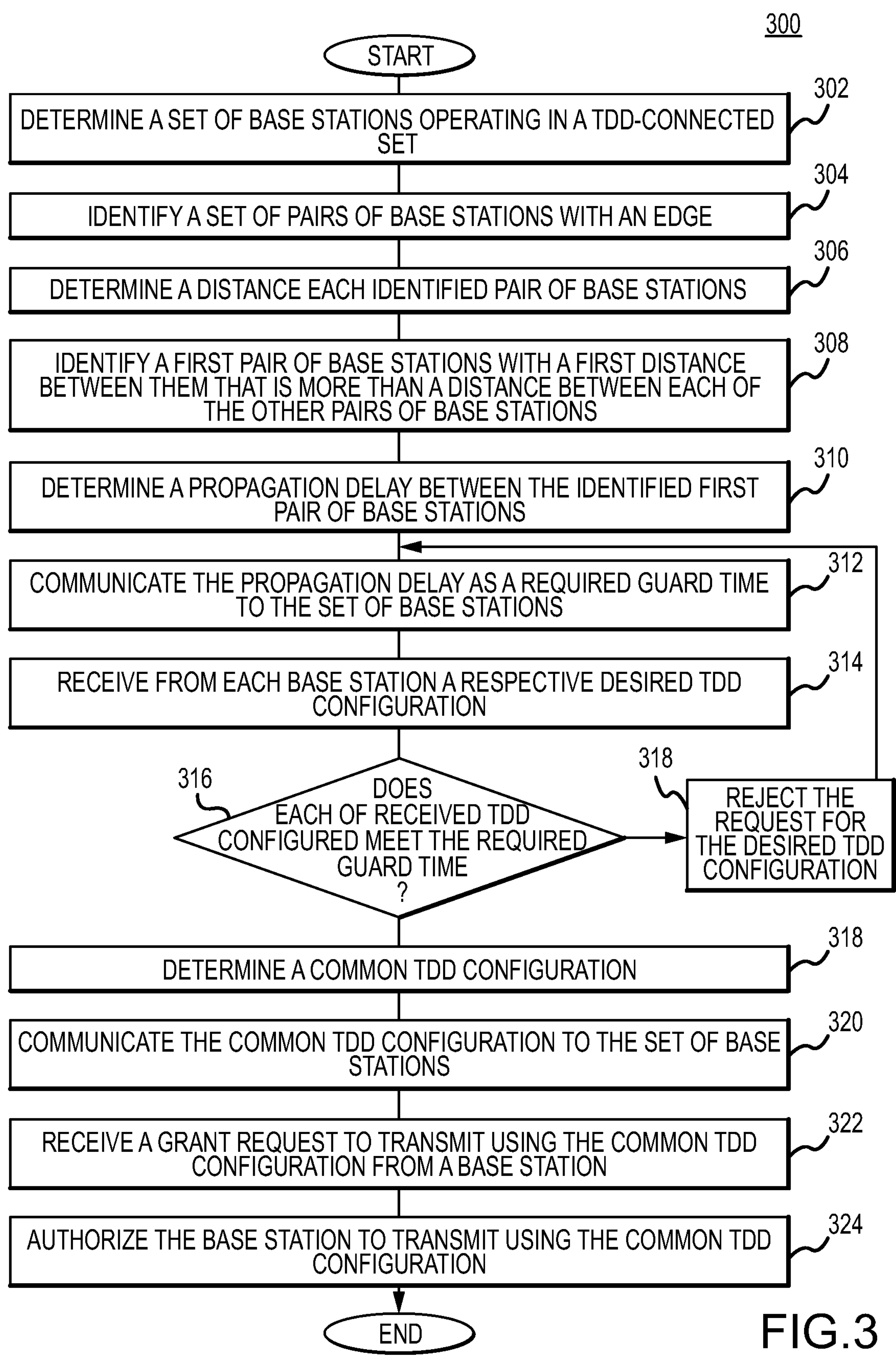
FIG. 3 illustrates an example flow chart of a method for implementing a SAS-coordinated TDD configuration for a TDD-connected set.

FIG. 3 illustrates an example flowchart of a method 300 for determining TDD configuration for CBSDs in a TDD-connected set, according to some embodiments of the present disclosure. Modifications, additions, or omissions may be made to method 300. Method 300 may include more, fewer, or other operations. For example, operations may be performed in parallel or in any suitable order. While at times discussed as the system 100, SAS 130, SAS server 131, CBSD 120, apparatus, or components of any of thereof performing operations, any suitable system or components of the system may perform one or more operations of the method 300. For example, one or more operations of method 300 may be implemented, at least in part, in the form of software instructions (e.g., software instructions 128 and 138 of FIG. 1), stored on tangible non-transitory computer-readable media (e.g., memory 126 and 136 of FIG. 1) that when run by one or more processors (e.g., processor 122 and 132 of FIG. 1) may cause the one or more processors to perform operations 302-326.

At operation 302, the SAS server 131 (acting as the administrator or presentation layer of SAS 130) determines a set of base stations (e.g., CBSDs 120) operating in a TDD-connected set 210. For example, the SAS server 131 may identify the set of base stations in the TDD-connected set 210 based on their geographic locations, terrain, and environment information, among other information, similar to that described in FIG. 2.

At operation 304, the SAS server 131 identifies a set of pairs of base stations (e.g., CBSDs 120) with an edge. In other words, the SAS server 131 may identify the set of pairs of base stations, where each pair of base stations is associated with a possibility of cross-link interference between them.

At operation 306, the SAS server 131 determines a distance 220 between each identified pair of base stations (e.g., CBSDs 120). For example, the SAS server 131 may compute the distance between each identified pair of base stations by determining the distance between their geographic locations.

At operation 308, the SAS server 131 identifies a first pair of base stations (e.g., CBSDs 120) with a first distance 220 between them which is more than a distance between each of the other pairs of base stations (e.g., CBSDs 120). In other words, the SAS server 131 may identify the first pair of base stations (e.g., CBSDs 120) that has a largest distance 220 between them among all the identified pairs of base stations (CBSDs 120) with an edge.

At operation 310, the SAS server 131 determines a propagation delay 222 between the identified first pair of base stations (e.g., CBSDs 120). For example, in this process, the SAS server 131 may determine the propagation delay 222 by implementing signal propagation models 226 and CBSD deployment information 224, similar to that described in FIG. 2.

At operation 312, the SAS server 131 communicates the propagation delay 222 as a required guard time 228 to the set of base stations (e.g., CBSDs 120). At operation 314, the SAS server 131 receives from each base station (e.g., CBSD 120) a respective desired TDD configuration 230.

At operation 316, the SAS server 131 determines whether each of the received TDD configuration 230 meets the required guard time 228. For example, for a given received TDD configuration 230, the SAS server 131 may compare a guard time indicated in the given received TDD configuration 230 with the required guard time 228. If the guard time indicated in the given received TDD configuration 230 is equal or more than the required guard time 228, the SAS server 131 may determine that the given received TDD configuration 230 meets the guard time requirement. Otherwise, if the guard time indicated in the given received TDD configuration 230 is less than the required guard time 228, the SAS server 131 may determine that the given received TDD configuration 230 does not meet the guard time requirement. If it is determined that each of the received TDD configurations 230 meets the required guard time 228, the method 300 proceeds to operation 320. Otherwise, the method 300 proceeds to operation 318.

At operation 318, the SAS server 131 rejects the request for the desired TDD configuration 230. In other words, the SAS server 131 rejects the TDD configuration(s) 230 that do not meet the required guard time 228. In such cases, the method returns to operation 312 and the SAS server 131 may resend the required guard time requirement (e.g., the required guard time 228) to those base stations (e.g., CBSDs 120) whose desired TDD configuration 230 did not meet the guard time requirement. In some embodiments, the SAS server 131 may resend the required guard time requirement to all the base stations (e.g., CBSDs 120) in the TDD-connected set 210.

At operation 320, the SAS server 131 determines a common TDD configuration 232. The determined common TDD configuration 232 may satisfy the desired TDD configurations 230 of more than a threshold number (e.g., more than 80%, 90%, etc.) of the base stations (e.g., CBSDs 120). For example, the common TDD configuration 232 may both meet the required guard time 228 and a desired downlink-to-uplink ratio across all or more than a threshold number (e.g., more than 80%, 90%, etc.) of base stations (e.g., CBSDs 120) in the TDD-connected set 210.

At operation 322, the SAS server 131 communicates the common TDD configuration 232 to the set of base stations (e.g., CBSDs 120). At operation 324, the SAS server 131 receives a grant request 234 to transmit using the common TDD configuration 232 from a base station (e.g., a CBSD 12). At operation 326, the SAS server 131 authorizes the base station (e.g., CBSD 120) to transmit using the common TDD configuration 232.

Figure 4:
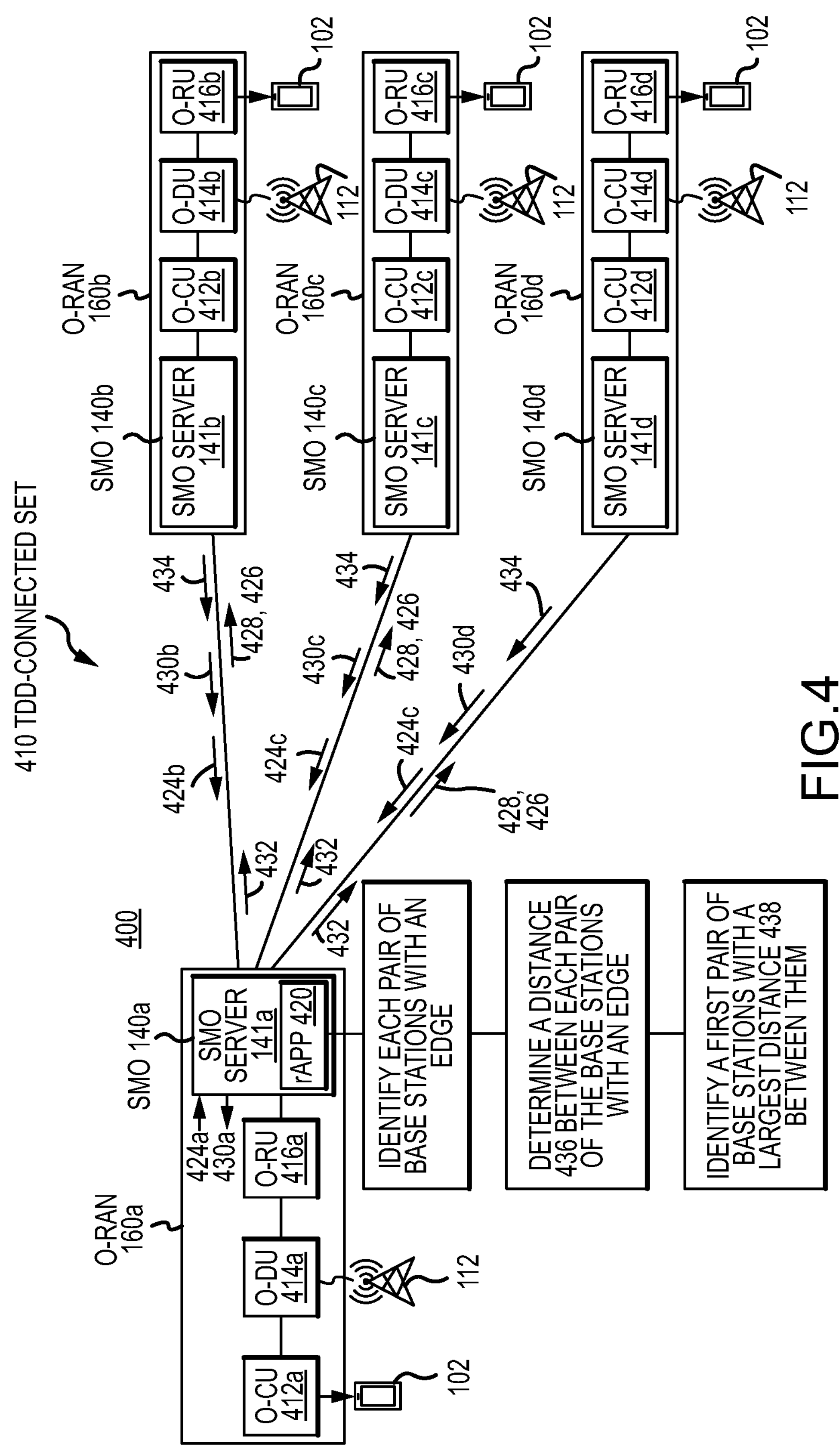
FIG. 4 illustrates an example operational flow of the system 100 of FIG. 1 for implementing a non-Real-time Radio Access Network (RAN) Intelligent Controller Application (rAPP)-coordinated TDD configuration among multiple Service Management and Orchestration (SMO) devices.

Example Operational Flow for Implementing an rAPP-Coordinated TDD Configuration Among Multiple SMOs FIG. 4 illustrates an example operational flow 400 of system 100 (see FIG. 1) for implementing a RAN Intelligent Controller Application (rAPP)-coordinated TDD configuration among multiple SMOs 140*a* to 140*d*. Each O-RAN 160*a* to 160*d* may be an instance of the O-RAN 160 described in FIG. 1. An O-RAN 160*a-d* architecture may include an O-CU 412*a-d*, O-DU 414*a-d*, O-RU 416*a-d*, and a SMO 140*a-d* associated with a SMO server 141*a-d*, respectively. Each of the SMOs 140*a* to 140*d* may be an instance of SMO 140 described in FIG. 1. Each O-RAN 160 (e.g., each O-RAN 160*a-d*) may be associated with a cell site where a base station 112 is located. Each base station 112 may include one O-CU 412. In some embodiments, one O-CU 412 may control one or more O-DUs 414. Further, each O-DU 4144 may support a plurality of cell sites. In certain embodiments, a cell site may include multiple O-RUs 416 controlled by one O-DU 414. Each of the components of the O-RAN may be communicatively coupled to each other wirelessly or by wires.

The O-CU 412 (e.g., each O-CU 412*a-d*) may be a network function (e.g., a software entity) in the O-RAN architecture and configured to implement control plane functions of the radio access network. The O-CU 412 may be further configured to manage RAN control plane, facilitate mobility management, session management, and interactions with the core network. In some embodiments, the O-CU 412 may be implemented in one or more computing devices, such as virtual machines, servers, and the like.

In certain embodiments, the O-CU 412 may be implemented by a cluster of computing devices located in a server farm. For example, the O-CU 412 may be implemented by a plurality of servers using distributed computing and/or cloud computing systems in a network. In certain embodiments, the SAS 130 may be implemented by a plurality of computing devices in one or more data centers. The SAS 130 may be formed by one or more physical devices configured to provide services and resources (e.g., data and/or hardware resources) for the components of the system 100. The O-CU 412 may be operably connected to the O-DU 414, e.g., via an F1 interface to facilitate the communication and coordination between the control and data planes of the O-RAN 160. The O-CU 412 may support the higher layers of the protocol stack such as the service data adaptation protocol (SDAP), packet data convergence protocol (PDCP), and radio resource control (RRC). The O-CU 412 connects to a 5G core which provides access to the network.

The O-DU 414 (e.g., each O-DU 414*a-d*) is generally a network function/node (e.g., a software entity) that is deployed at a cell site of a base station on a server and provides support for the lower layer of the protocol stack such as the Radio Link Control (RLC), medium access control (MAC), and parts of the PHY layer. The O-DU 414 may be configured to be connected to the CU 412 wirelessly or by wires. The O-DU 414 may be referred to herein interchangeably as an O-DU device.

The O-DU 414 may be configured to handle the RAN's data plane functions, error corrections, encoding/decoding, modulation/demodulation, and multiplexing. The O-RU 416 (e.g., each of O-RU 416*a-d*) may be or include radio components, such as radio antenna, radio frequency transceivers, filters, and amplifiers, among others. The O-RU 416 may be configured to handle the digital front-end functions, analog front-end function, analog-to-digital conversion, and the lower physical (PHY) layer. The O-RU 416 may be connected to the O-DU 414 wirelessly or by wires. The O-RU 416 is a network component that physically radiates and receives electromagnetic signals, for example, to communicate with UEs 102 (see FIG. 1). The O-RU 416 may be deployed at a cell site of the base station 112. The O-RU 416 may be referred to herein interchangeably as an O-RU device.

Each base station 112 may serve a respective coverage range to provide network communication to UEs 102 that are located in the coverage range. In operation, in non-CBRS use cases, the disclosed system 100 of FIG. 1 provides an alternative solution to coordinate TDD configuration among multiple SMOs 140*a-d*.

In the example of FIG. 4, each SMO 140*a-d* may manage a respective one or more cell sites, base stations 112, and UEs 102. In the illustrated embodiments, multiple SMOs 140*a-d* may manage O-DUs 414*a-d* in a TDD-Connected set 410. For example, in areas where spectrum is shared between different operators, each with its own SMO 140, the multiple SMOs 140 may need to coordinate with one another to manage a TDD-connected set 410 that spans across the respective networks of the SMOs 140.

In networks with multiple administrative domains, different SMOs 140 may manage different geographical regions or operational segments. Thus, if a TDD-connected set 410 spans across these regions or segments, multiple SMOs 140 may be required to coordinate a TDD configuration for the O-DUs 414 so that the uplink transmissions for the base stations 112 are synchronized within the TDD-connected set 410, and similarly, the downlink transmissions from the base stations 112 are synchronized within the TDD-connected set 410.

Designating an SMO as a Governing SMO

The operational flow 400 may begin when the SMOs 140 (and/or their operators) select one of the SMOs 140 (e.g., SMO 140*a*) as a designated/governing SMO 140 for all the SMOs 140. In some embodiments, the SMO 140*a* may be designated as the governing SMO 140 based on the agreement of the operators of the SMOs 140. In some embodiments, the SMO 140*a* may be designated as the governing SMO 140 at least because it is determined that the SMO 140*a* has the capability, such as computational, processing, and network resources to implement the rAPP 420 to execute an analysis similar to the operational flow 200 described in FIG. 2 to determine the required guard time for the TDD-connected set 410.

The rAPP 420 may be implemented by the processor 142 (see FIG. 1) of the SMO server 141*a* executing the software instructions 148 (see FIG. 1), and is generally configured to analyze network data to improve the processing and network resource allocation, improve coverage, improve energy efficiency, reduce interference, and others. In some embodiments, the rAPP 420 may be configured to abide by network policies for QoS, network traffic demands, load balancing, and the like. The rAPP 420 may be configured to receive network data from the SMOs 140 and monitor the network conditions to identify any issues and, in response to identifying an issue, implement a corrective or mitigation action to address the issue.

Determining the Required Guard Time for the TDD-Connected Set

In the example of FIG. 2, in response to the SMO 140*a* being selected as the governing SMO 140 among the SMOs 140*a-d*, each SMOs 140*b-d* may communicate the location of O-RU 416*b-d* and the deployment information 424*b-d*. In some embodiments, each SMO 140*b-d* may communicate the location of the O-RU 416*b-d* and the deployment information 424*b-d* via the respective SMO server 141*b-d* and an SMO-to-SMO interface to the governing SMO 140*a* (implemented by the SMO server 141*a*).

The SMO server 141_a_ may also access the location of its own O-RU 416_a_ and the deployment information 424_a_ that may be stored in a memory of the SMO server 141_a_. In some embodiments, the location of each O-RU 416_a-d_ may include longitude and latitude coordinates of the respective O-RU 416_a-d_. In some embodiments, the deployment information 424_a-d_ may include antenna patterns, propagation patterns, antenna height, antenna direction, transmitting power, frequency band, operational mode, location, device type (e.g., low-power, high-power), among others with respect to the respective O-DU 414, O-RU 416, and/or base station 112.

In response to accessing the locations of the O-RUs 416_a-d_ and the deployment information 424_a-d_, the governing SMO 140_a_ (via the SMO server 141_a_) may execute the rAPP 420. For example, in response to executing the rAPP 420, the rAPP 420 may perform operations similar to the operational flow 200. In this process, the SMO server 141_a_ (by executing the rAPP 420) may identify the base stations 112 within the TDD-connected set 410. For example, the SMO server 141 may determine the base stations 112 that are within the TDD-connected set 410 based on their geographic locations, terrain, environment information, a predefined distance, and the like, similar to that described in FIG. 2. The SMO server 141 may then identify each pair of base stations 112 with an edge. In other words, the SMO server 141_a_ may determine each pair of base stations 112 associated with a possibility of cross-link interference between them. For example, the SMO server 141_a_ may identify that there is a possibility of cross-link interference between two base stations 112 if the two base stations 112 have direct communication with each other, have overlapping coverage area, have overlapping frequency bands, and/or if they are located within a close proximity from each other such that their signal transmissions could interfere with each other.

In response, the SMO server 141_a_ may determine a distance 436 between each pair of base stations 112 with an edge. The SMO server 141_a_ may identify a first pair of base stations 112 (with an edge) that have the largest distance 438 between them compared to each distance 436 between other pairs of base stations 112 (with an edge). For example, the SMO server 141_a_ may compare the distances 436 between each pair of base stations 112 with other distances 436 and determine which pair of base stations 112 (with an edge) are farthest apart from each other compared to all the other pairs of base stations 112 with an edge.

The SMO server 141_a_ may determine a propagation delay 426 between the identified pair of base stations 112 with the largest distance 438 between them. For example, in this process, the SMO server 141_a_ may implement signal propagation models, e.g. using the speed of light, 226 and deployment information 424 to determine the propagation delay 426 between the identified pair of base stations 112 with the largest distance 438 between them.

The SMO server 141_a_ may communicate the propagation delay 426 as the required guard time 428 to the SMO servers 141_b-d_ (in other words to the SMOs 140_b-d_). In response, the SMO server 141_a_ may receive a set of desired TDD configurations 430_b-d_ from the SMO servers 141_b-d_, respectively. Each desired TDD configuration 430_b-d_ may include a respective guard time, a downlink-to-uplink ratio, and other information. Each desired TDD configuration 430_b-d_ may be determined according to the network traffic need/demand of the respective base station 112/O-DU 414_b-d_. The SMO server 141_a_ may also determine a desired TDD configuration 430_a_ from the base station(s) 112 that are managed by the SMO 140_a_. The desired TDD configuration 430_a_ may TD include a guard time, a downlink-to-uplink ratio, and other information, and be determined according to the network traffic need/demand of the respective base station 112/O-DU 414_a_.

In response, the SMO server 141_a_ may determine whether each desired TDD configuration 430_a-d_ meets the required guard time 428. If it is determined that a TDD configuration 430 request received from a particular base station 112 does not meet the required guard time 428, the SMO server 141_a_ may reject the request and resend the required guard time 428 to the SMO server 141 managing the particular base station 112. Alternatively or additionally, the SMO server 141_a_ may recommend to the particular base station 112 to lower the transmitting power from the interfering cell to reduce the cross-link interference. If it is determined that the requests for the TDD configurations 430 meet the required guard time 428, the SMO server 141_a_ may determine a recommended/common TDD configuration 432 for the base stations 112 within the TDD-connected set 410.

In some embodiments, the common TDD configuration 432 may be determined to satisfy the requests for the desired TDD configurations 430 of more than a threshold number (e.g., more than 80%, 90%, etc.) of the base stations 112 in the TDD-connected set 410. In some embodiments, the common TDD configuration 432 may be determined to satisfy a majority (e.g., more than a threshold number of requests) of downlink-to-uplink ratios requested by the base stations 112 in the TDD-connected set 410. In some embodiments, the common TDD configuration 432 may be determined to satisfy a midway (e.g., an average or median) of downlink-to-uplink ratios requested by the base stations 112 in the TDD-connected set 410.

In response, the SMO server 141_a_ may communicate the common TDD configuration 432 to the SMO servers 141_b-d_, via the SMO-to-SMO interface. Each SMO server 141_b-d_ may forward the common TDD configuration 432 that includes and is according to the required guard time 428 to the respective O-DUs 414_b-d_ (e.g., base stations 112), e.g., via the O1 interface. In turn, a base station 112 may send a grant request 434 for using the common TDD configuration 432 to the SMO server 141_a_. In response, the SMO server 141_a_ may authorize the base station 112 to use the common TDD configuration 432 for signal communication.

Method for Configuring a TDD Configuration in an O-RAN Network

Figure 5:
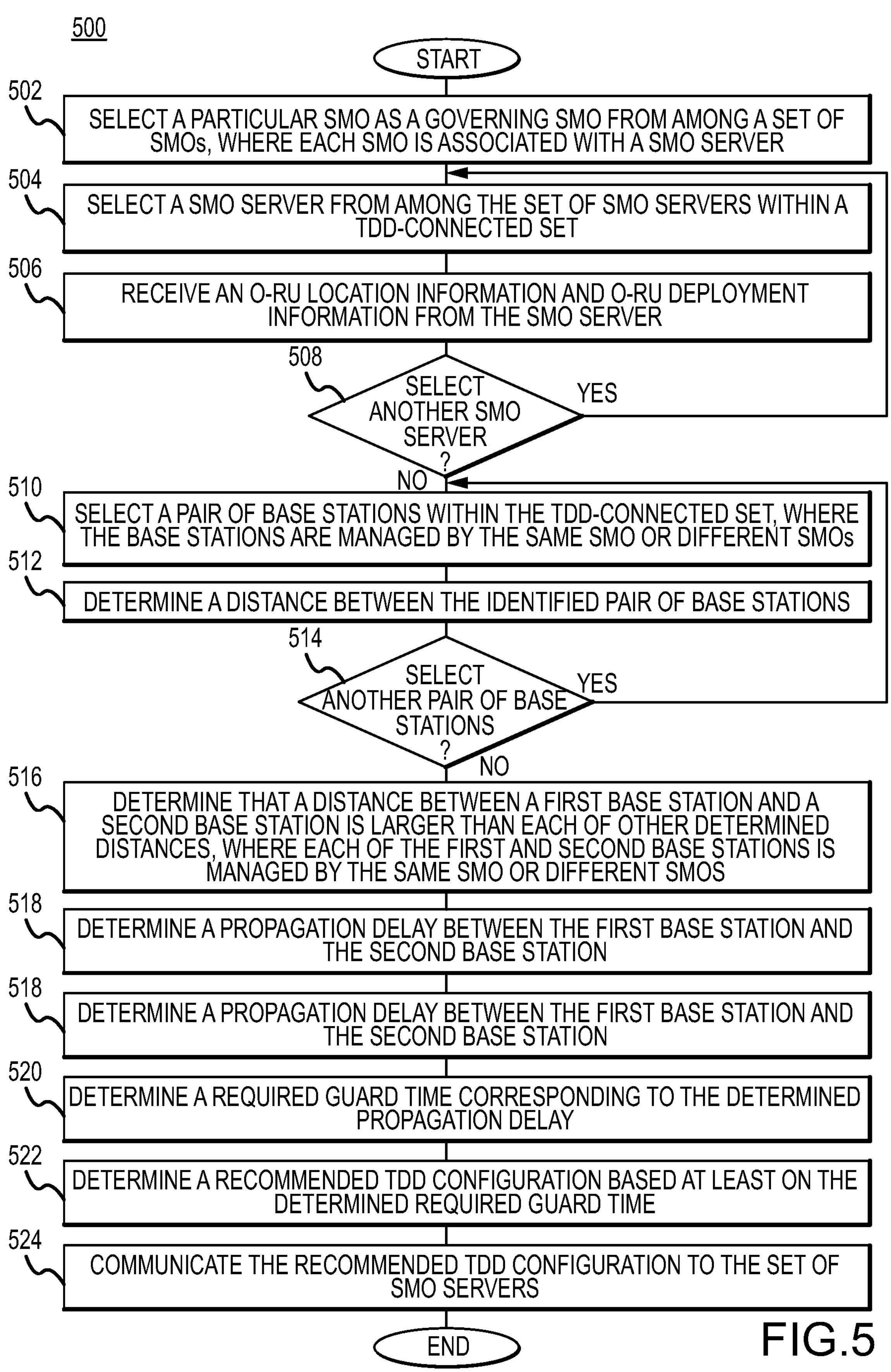
FIG. 5 illustrates an example flow chart of a method for implementing an rAPP-coordinated TDD configuration among multiple SMO devices.

FIG. 5 illustrates an example flowchart of a method 500 for configuring a TDD configuration in an O-RAN network, according to some embodiments of the present disclosure. Modifications, additions, or omissions may be made to method 500. Method 500 may include more, fewer, or other operations. For example, operations may be performed in parallel or in any suitable order. While at times discussed as the system 100, SMOs 140_a-d_, SMO servers 141_a-d_, or components of any of thereof performing operations, any suitable system or components of the system may perform one or more operations of the method 500. For example, one or more operations of method 500 may be implemented, at least in part, in the form of software instructions (e.g., software instructions 148 and 119 of FIG. 1), stored on tangible non-transitory computer-readable media (e.g., memory 146 and 117 of FIG. 1) that when run by one or more processors (e.g., processor 118 and 142 of FIG. 1) may cause the one or more processors to perform operations 502-524.

At operation 502, the set of SMOs 140_a-d_ (and/or the set of SMO servers 141_a-d_) select a particular SMO 140 as a governing SMO 140 from among a set of SMOs 140*a-d*, where each SMO 140*a-d* is associated with a SMO server 141*a-d*. For example, the SMO 140*a* associated with the SMO server 141*a* may be selected, similar to that described in FIG. 4. The SMO 140*a* (and the SMO server 141*a*) may be selected based at least on determining that the SMO server 141*a* is configured with at least a threshold amount of processing resources to be able to coordinate the recommended TDD configuration 432 among the set of SMO servers 141*a-d*.

At operation 504, the SMO server 141*a* selects an SMO server 141*b-d* from among the set of SMO servers 141*b-d* within the TDD-connected set 410. The SMO server 141*a* may iteratively select an SMO server 141*b-d* until no SMO server is left for evaluation.

At operation 506, the SMO server 141*a* receives an O-RU antenna location information and O-RU deployment information 424*b-d* from the SMO server 141*b-d*. The O-RU deployment information 424*b-d* may include antenna patterns, propagation patterns antenna heights, transmitting power, frequency bandwidth, and other network parameters associated with a respective O-RU 416*b-d*. In some embodiments, the O-RU antenna location information and O-RU deployment information 424*b-d* may be provided manually to the governing SMO server 141*a* by the operators of the SMO servers 141*b-d*. In some embodiments, the O-RU antenna location information and O-RU deployment information 424*b-d* may be provided to the SMO server 141*a* automatically in response to the SMO server 141*a* being selected as the governing SMO.

At operation 508, the SMO server 141*a* determines whether to select another SMO server 141*b-d*. If it is determined that another SMO server is left for evaluation, the method 500 returns to operation 504. Otherwise, the method 500 proceeds to operation 510.

At operation 510, the SMO server 141*a* selects a pair of base stations 112 within the TDD-connected set 410, where the base stations 112 may be managed by the same SMO 140*a-d* or different SMOs 141*a-d*. For example, the SMO server 141*a* may identify each pair of base stations 112 with an edge and evaluate each pair, similar to that described in FIG. 4.

At operation 512, the SMO server 141*a* determines a distance between the identified pair of base stations 112.

At operation 514, the SMO server 141*a* determines whether to select another pair of base stations 112. For example, if it is determined that another pair of base stations 112 with an edge is left for evaluation, the method 500 may return to the operation 510. Otherwise, the method 500 proceeds to operation 516.

At operation 516, the SMO server 141*a* determines that a distance 436 between the identified pair of base stations 112 is larger than each of the other determined distances 436.

At operation 518, the SMO server 141*a* determines a propagation delay 426 between the first base station 112 and the second base station 112. Each of the first base station 112 and the second base station 112 may be managed by the same SMO 140*a-d* or different SMOs 140*a-d*.

At operation 520, the SMO server 141*a* determines a required guard time 428 corresponding to the propagation delay 426. The required guard time 428 indicates a required time gap between an uplink transmission and a downlink transmission for each of a set of base stations 112 operating in the TDD-connected set 410.

At operation 522, the SMO server 141*a* determines a recommended TDD configuration 432 based at least on the determined required guard time 428. The TDD configuration 432 may further be based on desired TDD configurations 430*a-d*, similar to that described in FIG. 4.

At operation 524, the SMO server 141*a* communicates the recommended TDD configuration 432 to the set of SMO servers 141*b-d*. Each SMO server 141*a-b* may utilize the recommended TDD configuration 432 in their signal communication, similar to that described in FIG. 4. For example, each SMO server 141*a-d* may transmit an uplink signal and receive a downlink signal according to the recommended TDD configuration 432.

In some embodiments, the SMO server 141*a* may receive a third O-RU antenna location information and a third O-RU deployment information 424 from a SMO server 141*b-d*. In response, the SMO server 141*a* may determine that the distance 436 between the first and second base stations 112 is larger than the distance 436 between other pairs of base stations 112. The required guard time 428 may be determined based on determining that the distance 436 between the first and second base stations 112 is larger than each distance between other pairs of base stations 112.

Figure 6:
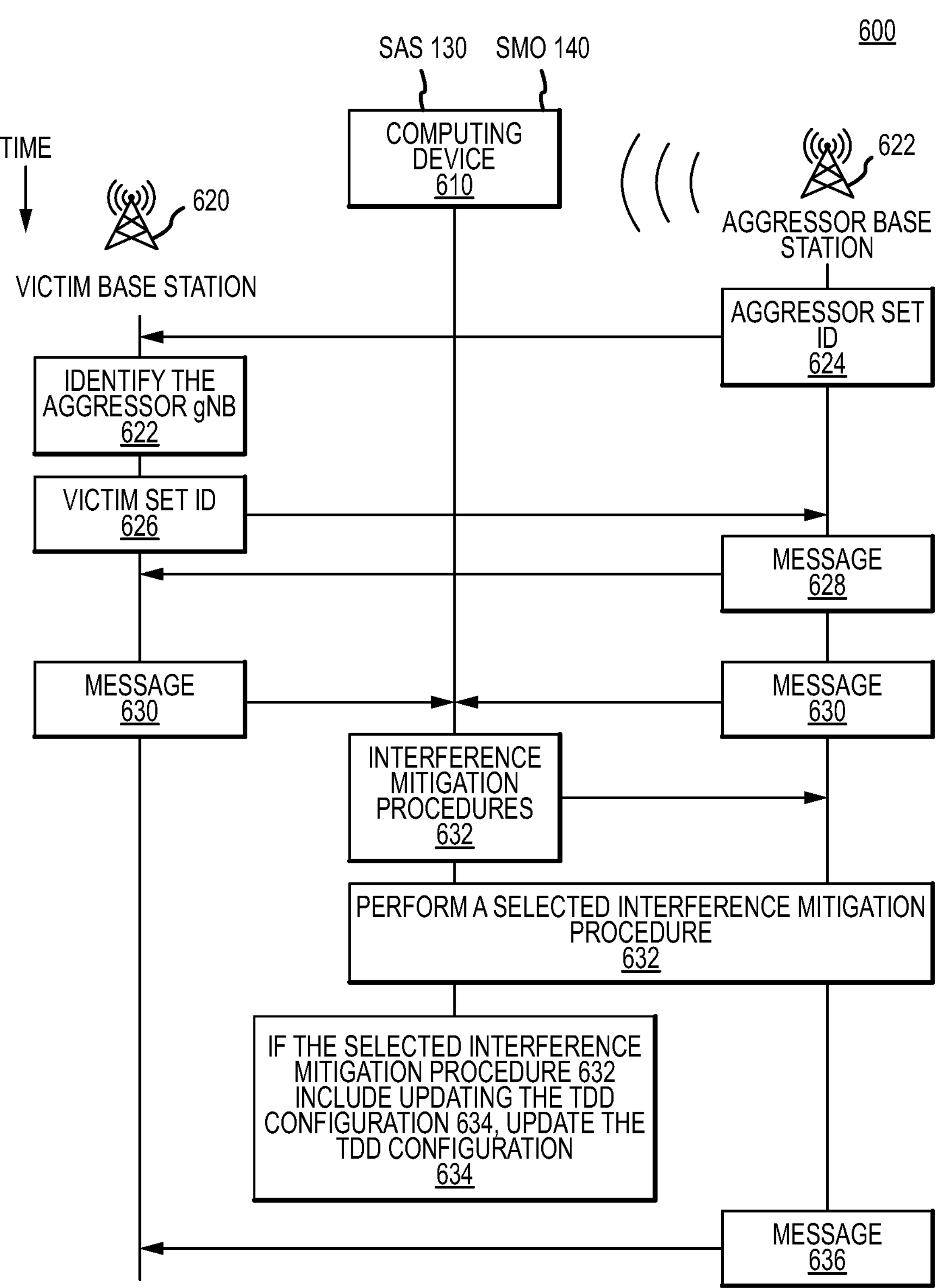
FIG. 6 illustrates an operational flow of the system 100 of FIG. 1 for mitigating remote interference between an aggressor and victim base stations managed by a SAS/SMO.

Operational Flow for Mitigating Remote Interference in a Mobile Network Managed by a Single SAS/SMO FIG. 6 illustrates an example operational flow 600 of the system 100 (see FIG. 1) for mitigating remote interference in a mobile network managed by a single computing device 610 which may be either managed by SAS 130 (described in FIG. 1) or SMO 140 (described in FIG. 1). In such cases, the single computing device 610 may be referred to as a SAS server 131 (described in FIG. 1) or a SMO server 141 (described in FIG. 1). In O-RAN network, at least some operations of the operational flow 600 may be performed by a SMO 140 (and the computing device 610 which may correspond to the SMO server 141).

In non-O-RAN network, at least some operations of the operational flow 600 may be performed by a SAS 130 (and the computing device 610 which may correspond to the SAS server 131).

In some cases, even after interference within a TDD-connected set (e.g., TDD-connected set 210 in FIG. 2 and TDD-connected set 410 in FIG. 4) is mitigated by the operational flows 200 and 400 in FIGS. 2 and 4, respectively, still, a remote interference that is originated from a source outside the TDD-connected set may be detected by a base station in the TDD-connected set. To address and mitigate such remote interferences, the operational flows 600 and 700 may be implemented by the system 100 of FIG. 1.

Identifying the Aggressor Base Station

The operational flow 600 begins when the victim base station 620 experiences an interference originating from the aggressor base station 622. Each of the victim base station 620 and the aggressor base station 622 may be an instance of a base station 112 described in FIG. 1. For example, the victim base station 620 may receive a remote interference management (RIM) reference signal along with aggressor set identifier (ID) 624 from the aggressor base station 622. In this way the victim base station 620 may identify the aggressor base station 622 based on its RIM aggressor set ID 624.

In response, the victim base station 620 may transmit a RIM reference signal with a victim set ID 626 to the aggressor base station 622 to inform the aggressor base station 622 that it needs to commence or perform an interference mitigation procedure. The victim set ID 624 may be an indication that the victim base station 620 is experiencing remote interference. In this way, the victim base station 620 may inform the aggressor base station 622 that the aggressor base station 622 is causing interference at the victim base station 620.

The aggressor base station 622 may transmit a message 628 that indicates the aggressor base station 622 is going to perform an interference mitigation procedure. For example, the message 628 may include a RIM reference signal with aggressor set ID 624 and the indication that aggressor base station 622 is going to perform an interference mitigation procedure. The victim base station 620 and/or the aggressor base station 622 may transmit a message 630 to the computing device 610 (e.g., SAS/SMO server), where the message 630 informs the computing device 610 about the interference from the aggressor base station 622 experienced by the victim base station 620.

Implementing a Selected Interference Mitigation Procedure

The computing device 610 may determine a set of interference mitigation procedures 632. For example, the set of interference mitigation procedures 632 may include updating a TDD configuration for a set of base stations managed by the computing device 610 in a TDD-connected set (e.g., the TDD-connected set 210 in FIG. 2 or TDD-connected set 410 in FIG. 4). The computing device 610 may select one of the interference mitigation procedures 632. For example, the computing device 610 may select a particular interference mitigation procedure 632 that is more feasible to perform, may lead to requiring spending fewer network and processing resources compared to other procedures 632, may lead to mitigating the detected interference in a less time compared to other procedures 632, among other criteria.

In response, the computing device 610 may recommend the selected interference mitigation procedure 632 to the aggressor base station 622. In some embodiments, the computing device 610 may perform the selected interference mitigation procedure 632. For example, if the selected interference mitigation procedure 632 includes updating a TDD configuration 634 of a set of base stations in the TDD-connected set managed by the computing device 610, the computing device 610 may update the TDD configuration 634 for the base stations comprising the aggressor base station 622 and other base stations in the TDD-connected set. For example, updating the TDD configuration 634 may comprise changing a required guard time, where the required guard time indicates a required time gap between an uplink transmission and a downlink transmission for each of the set of base stations operating the first TDD-connected set.

The computing device 610 may communicate the updated TDD configuration 634 to the aggressor base station 622 and other base stations in the TDD-connected set. Each base station in the TDD-connected set may send a grant request with the updated TDD configuration 634 to the computing device 610, and the computing device 610 may authorize the grant request, similar to that described in FIG. 2.

In some embodiments, the aggressor base station 622 may perform the selected interference mitigation procedure 632. For example, if the selected interference mitigation procedure 632 includes adjusting an operating frequency band of the aggressor base station 622, adjusting a transmitting beam angle at the aggressor base station 622, or other procedures that can be performed by the aggressor base station 622, the selected interference mitigation procedure 632 may be performed by the aggressor base station 622.

The aggressor base station 622 may send a message 636 that indicates the selected interference mitigation procedure 632 has commenced to the victim base station 620. In response, the victim base station 620 may stop transmitting the victim set ID 626 to the aggressor base station 622.

Figure 7:
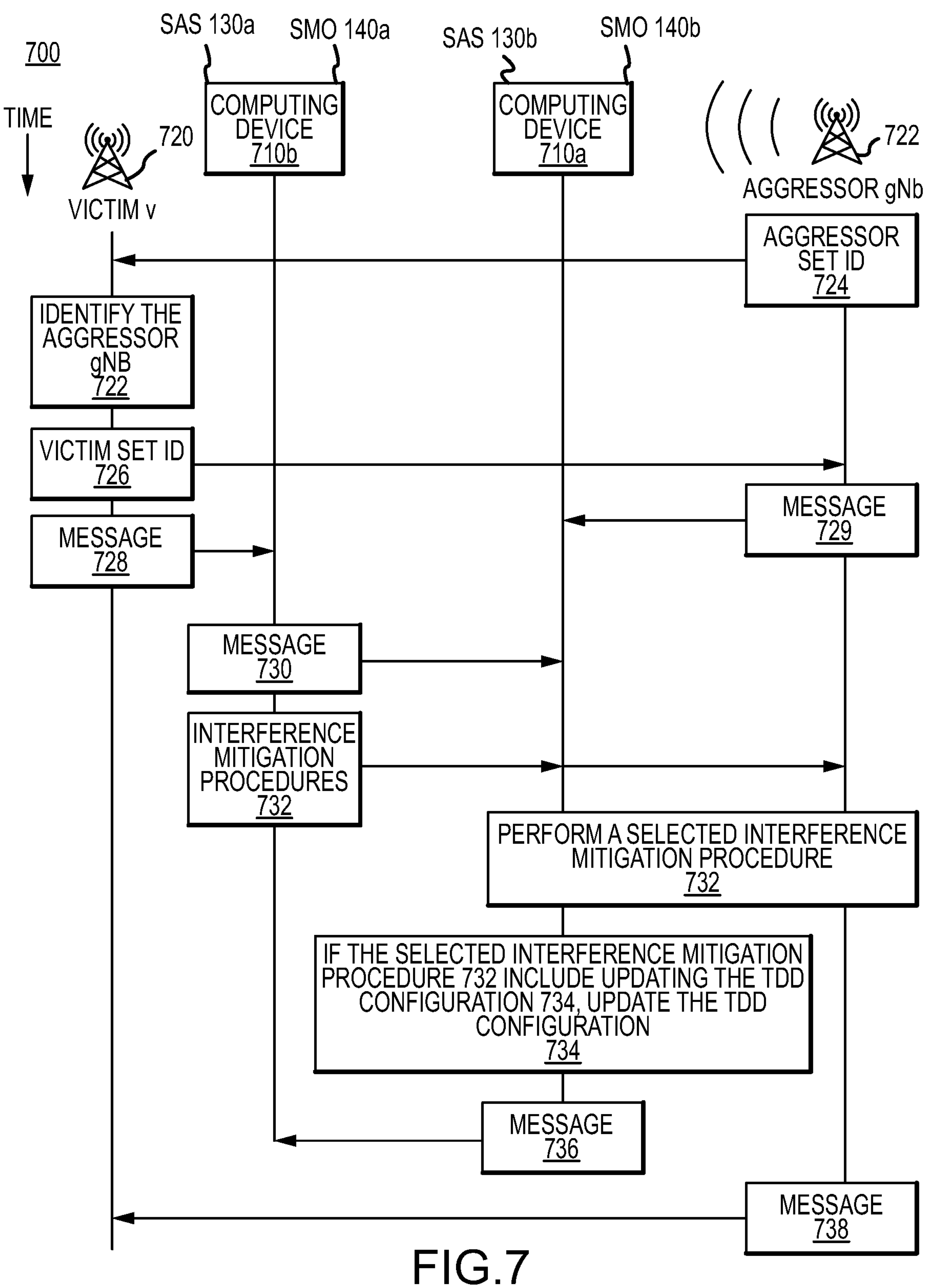
FIG. 7 illustrates an operational flow of the system 100 of FIG. 1 for mitigating remote interference between an aggressor and victim base stations managed by two SAS/SMOs.

Operational Flow for Mitigating Remote Interference in a Mobile Network Managed by Multiple SAS/SMOs FIG. 7 illustrates an example operational flow 700 of the system 100 (see FIG. 1) for mitigating remote interference in a mobile network managed by multiple computing devices 610*a-b*. Each computing device 610*a-b* may be either managed by SAS 130 (described in FIG. 1) or SMO 140 (described in FIG. 1). In such cases, each computing device 610*a-b* may be referred to as a SAS server 131 (described in FIG. 1) or a SMO server 141 (described in FIG. 1). In O-RAN network, at least some operations of the operational flow 700 may be performed by SMOs 140*a-b* (and the computing devices 610*a-b* which may correspond to the SMO servers 141*a-b*, respectively). In non-O-RAN network, at least some operations of the operational flow 700 may be performed by SASs 130*a-b* (and the computing device 160*a-b* which may correspond to the SAS servers 131*a-b*).

In the example of FIG. 7, the victim base station 710 is managed by the computing device 710*b* (e.g., SAS/SMO), and the aggressor base station 722 is managed by the computing device 710*a* (e.g., SAS.SMO). Further in the example of FIG. 7, the computing device 710*a* may manage a first TDD-connected set, the computing device 710*b* may manage a second TDD-connected set, and the first TDD-connected set and the second TDD-connected set may be distinct or have overlapping base station(s), such as the victim base station 720 and/or the aggressor base station 722. Thus, each of the victim base station 720 and the aggressor base station 722 may be managed and belong to the same TDD-connected set or different TDD-connected sets.

Identifying the Aggressor Base Station

The operational flow 700 begins when the victim base station 720 experiences an interference originating from the aggressor base station 722. Each of the victim base station 720 and the aggressor base station 722 may be an instance of a base station 112 described in FIG. 1. For example, the victim base station 720 may receive a remote interference management (RIM) reference signal, as defined in 3GPP TS 38.300, along with aggressor set identifier (ID) 724 from the aggressor base station 722.

In this way the victim base station 720 may identify the aggressor base station 722 based on its RIM aggressor set ID 724. In response, the victim base station 720 may transmit a RIM reference signal with a victim set ID 726 to the aggressor base station 722 to inform the aggressor base station 722 that it needs to commence or perform an interference mitigation procedure. The victim set ID 724 may be an indication that the victim base station 720 is experiencing remote interference. In this way, the victim base station 720 may inform the aggressor base station 722 that the aggressor base station 722 is causing interference at the victim base station 720.

In some embodiments, the victim base station 720 may transmit a message 728 to the computing device 710*b* managing the victim base station 720, where the message 728 informs the computing device 710*b* about the interference from the aggressor base station 722 experienced by the victim base station 720. The message 728 may include the aggressor set ID 724 identifying the aggressor base station 622 and/or the victim set ID 726 identifying the victim base station 720.

In some embodiments, the aggressor base station 722 may transmit a message 729 to the computing device 710*a* managing the aggressor base station 722, where the message 729 informs the computing device 710*a* about the interference from the aggressor base station 722 experienced by the victim base station 720. The message 729 may include the aggressor set ID 724 identifying the aggressor base station 622 and/or the victim set ID 726 identifying the victim base station 720.

In some embodiments, the computing device 710*a* may receive a message 730 from the computing device 710*b*, where the message 730 indicates the victim base station 720 is experiencing interference from the aggressor base station 722. The message 730 may include the aggressor set ID 724 identifying the aggressor base station 622 and/or the victim set ID 726 identifying the victim base station 720.

Thus, the computing device 710*a* may identify the aggressor base station 722 based at least on the aggressor set ID 724. The computing device 710*b* determines a set of interference mitigation procedures 732. The interference mitigation procedures 732 may correspond to the interference mitigation procedures 632 described in FIG. 6.

The computing device 710*a* may receive the set of interference mitigation procedures 732 to address the interference experienced by the victim base station 720 from the computing device 710*b*. The computing device 710*a* may select one of the interference mitigation procedures 732, similar to that described in FIG. 6 with respect to the computing device 610 selecting one of the interference mitigation procedures 632. In response, the computing device 710*a* may recommend the selected interference mitigation procedure 732 to the aggressor base station 722.

In some embodiments, the computing device 710*a* may perform the selected interference mitigation procedure 732. For example, if the selected interference mitigation procedure 732 includes updating a TDD configuration 734 of a set of base stations in the TDD-connected set managed by the computing device 710*a*, the computing device 710*a* may update the TDD configuration 734 for the base stations comprising the aggressor base station 722 and other base stations in the TDD-connected set. For example, updating the TDD configuration 734 may comprise changing a required guard time, where the required guard time indicates a required time gap between an uplink transmission and a downlink transmission for each of the set of base stations operating the first TDD-connected set.

The computing device 710*a* may communicate the updated TDD configuration 734 to the aggressor base station 722 and other base stations in the TDD-connected set. Each base station in the TDD-connected set may send a grant request with the updated TDD configuration 734 to the computing device 710*a*, and the computing device 710*a* may authorize the grant request, similar to that described in FIG. 2.

In some embodiments, the aggressor base station 722 may perform the selected interference mitigation procedure 732. For example, if the selected interference mitigation procedure 732 includes adjusting an operating frequency band of the aggressor base station 722, adjusting a transmitting beam angle at the aggressor base station 722, or other procedures that can be performed by the aggressor base station 722, the selected interference mitigation procedure 732 may be performed by the aggressor base station 722.

The computing device 710*a* may transmit a message 736 that indicates the selected interference mitigation procedure 732 has commenced to the computing device 710*b*. The aggressor base station 722 may send a message 738 that indicates the selected interference mitigation procedure 732 has commenced to the victim base station 720. In response, the victim base station 720 may stop transmitting the victim set ID 726 to the aggressor base station 722. Any and any combination of operations in any of the embodiments described in FIGS. 1-8 may be performed in conjunction with each other.

Method for Mitigating Remote Interference in a Mobile Network

Figure 8:
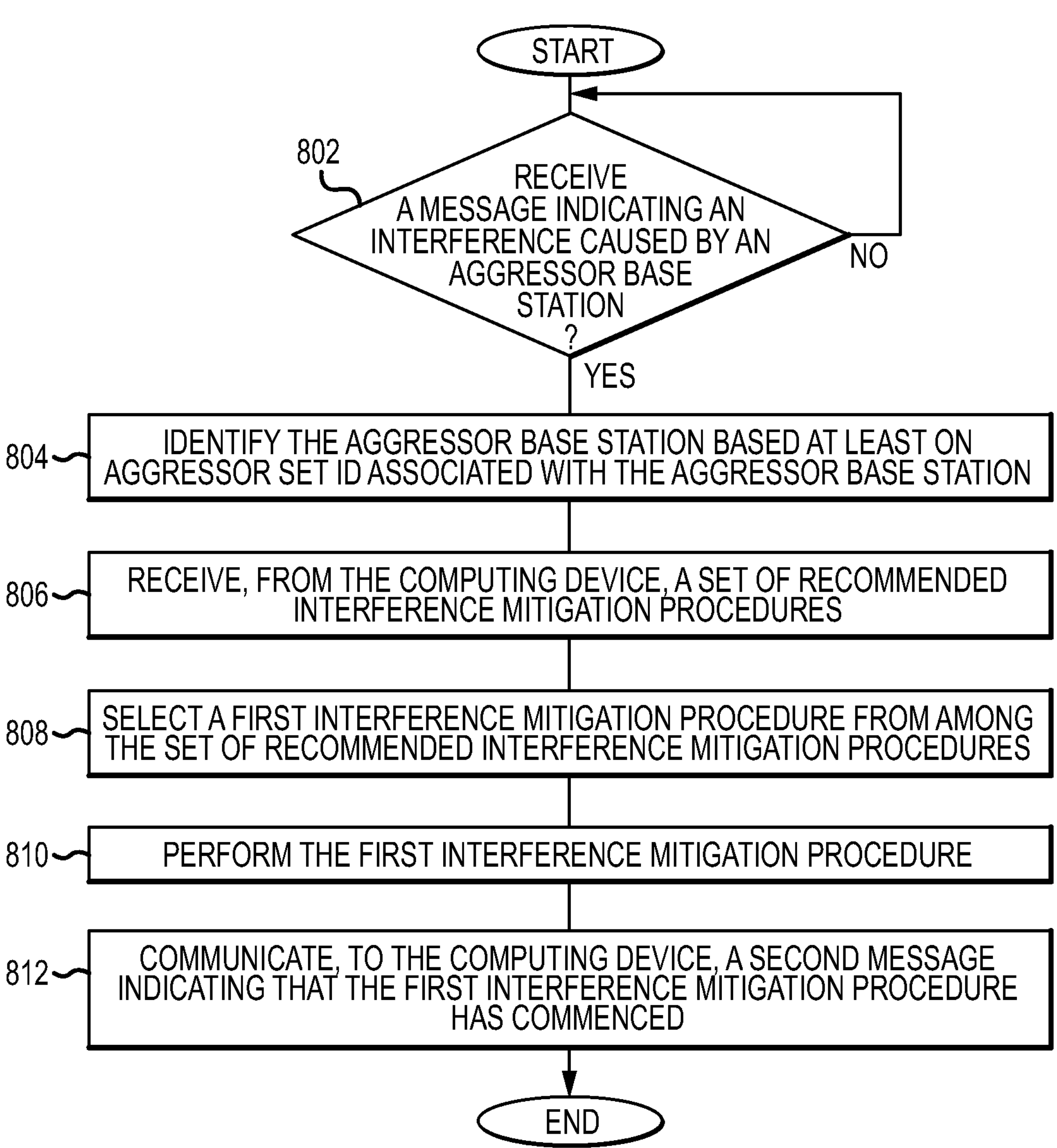
FIG. 8 illustrates an example flow chart of a method for mitigating remote interference between aggressor and victim base stations.

FIG. 8 illustrates an example flowchart of a method 800 for mitigating remote interference in a mobile network, according to some embodiments of the present disclosure. Modifications, additions, or omissions may be made to method 800. Method 800 may include more, fewer, or other operations. For example, operations may be performed in parallel or in any suitable order. While at times discussed as the system 100, computing devices 710*a-b*, SAS, SMO, or components of any of thereof performing operations, any suitable system or components of the system may perform one or more operations of the method 800. For example, one or more operations of method 800 may be implemented, at least in part, in the form of software instructions (e.g., software instructions 138, 148, and 119 of FIG. 1), stored on tangible non-transitory computer-readable media (e.g., memory 136, 146, and 117 of FIG. 1) that when run by one or more processors (e.g., processor 132, 142, and 118 of FIG. 1) may cause the one or more processors to perform operations 802-812.

At operation 802, the computing device 710*a* determines whether a message 730 indicating an interference caused by an aggressor base station 722 is received. If it is determined that the message 730 is not received, the computing device 710*a* may wait until the message 730 is received. If it is determined that the message 730 is received, the method 800 may proceed to operation 804.

At operation 804, the computing device 710*a* identifies the aggressor base station 722 based at least on the aggressor set ID 724 associated with the aggressor base station 722, similar to that described in FIG. 7.

At operation 806, the computing device 710*a* receives, from the computing device 710*b*, a set of recommended interference mitigation procedures 732. Examples of the interference mitigation procedures 732 are described in FIG. 7.

At operation 808, the computing device 710*a* selects a first interference mitigation procedure 732 from among the set of interference mitigation procedures 732. For example, the computing device 710*a* may select the first interference mitigation procedure 732 that is more feasible to perform, may lead to requiring spending fewer network and processing resources compared to other procedures 732, may lead to mitigating the detected interference in a less time compared to other procedures 732, among other criteria.

At operation 810, the computing device 710*a* performs the first interference mitigation procedure 732, similar to that described in FIG. 7. In some embodiments, the operation 810 may include the aggressor base station 722 performing the first interference mitigation procedure 732, similar to that described in FIG. 7.

At operation 812, the computing device 710*a* communicates, to the computing device 710*b*, a second message 736 indicating that the first interference mitigation procedure 732 has commenced.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for mitigating remote interference in a mobile network, comprising:
- a first Service Management and Orchestration (SMO) device comprising:
  - a memory configured to store information identifying a second SMO device; and
  - a processor, operably coupled to the memory, and configured to:
    - receive, from the second SMO device, a first message indicating that a first base station is experiencing interference from a second base station, wherein the first message comprises an aggressor set identifier (ID) identifying the second base station;
    - identify the second base station based at least in part upon the aggressor set ID;
    - receive, from the second SMO device, at least one recommended interference mitigation procedure to address the interference experienced by the first base station;
    - select a first interference mitigation procedure from among the at least one recommended interference mitigation procedure;
    - perform the first interference mitigation procedure; and
    - communicate, to the second SMO device, a second message indicating that the first interference mitigation procedure has commenced.

2. The system of claim 1, wherein the processor is further configured to:
- determine that the first interference mitigation procedure comprises updating a Time Division Duplexing (TDD) configuration for a set of base stations operating in a first TDD-connected set, wherein the set of base stations comprises the second base station; and
- in response to determining that the first interference mitigation procedure comprises updating the TDD configuration for the set of base stations operating in the first TDD-connected set:
  - update the TDD configuration for the set of base stations; and
  - communicate the updated TDD configuration to the set of base stations.

3. The system of claim 2, wherein updating the TDD configuration comprises changing a required guard time, wherein the required guard time indicates a required time gap between an uplink transmission and a downlink transmission for each of the set of base stations operating the first TDD-connected set.

4. The system of claim 1, wherein:
- a third message comprising the aggressor set ID is sent to the first base station in response to first message being received by the first SMO device; and
- in response to the first interference mitigation procedure being commenced, a transmission of the aggressor set ID to the first base station is stopped.

5. The system of claim 1, wherein the at least one recommended interference mitigation procedure comprises at least one of:
- adjusting a transmitting beam angle at the second base station,
- adjusting an operating frequency band operated at the second base station; or
- updating a Time Division Duplexing (TDD) configuration.

6. The system of claim 1, wherein the first message further comprises a victim set identifier (ID) identifying the first base station.

7. The system of claim 2, wherein:
- the first base station is managed by the second SMO device;
- the second base station is managed by the first SMO device;
- the first SMO device is associated with the first TDD-connected set;
- the second SMO device is associated with a second TDD-connected set; and
- the first TDD-connected set is distinct from the second TDD-connected set.

8. A method for mitigating remote interference in a mobile network, comprising:
- storing information identifying a second SMO device;
- receiving, from the second SMO device, a first message indicating that a first base station is experiencing interference from a second base station, wherein the first message comprises an aggressor set identifier (ID) identifying the second base station;
- identifying the second base station based at least in part upon the aggressor set ID;
- receiving, from the second SMO device, at least one recommended interference mitigation procedure to address the interference experienced by the first base station;
- selecting a first interference mitigation procedure from among the at least one recommended interference mitigation procedure;
- performing the first interference mitigation procedure; and
- communicating, to the second SMO device, a second message indicating that the first interference mitigation procedure has commenced.

9. The method of claim 8, further comprising:
- determining that the first interference mitigation procedure comprises updating a Time Division Duplexing (TDD) configuration for a set of base stations operating in a first TDD-connected set, wherein the set of base stations comprises the second base station; and
- in response to determining that the first interference mitigation procedure comprises updating the TDD configuration for the set of base stations operating in the first TDD-connected set:

updating the TDD configuration for the set of base stations; and communicating the updated TDD configuration to the set of base stations.

10. The method of claim 9, wherein updating the TDD configuration comprises changing a required guard time, wherein the required guard time indicates a required time gap between an uplink transmission and a downlink transmission for each of the set of base stations operating the first TDD-connected set.

11. The method of claim 8, wherein:

a third message comprising the aggressor set ID is sent to the first base station in response to first message being received by the first SMO device; and in response to the first interference mitigation procedure being commenced, a transmission of the aggressor set ID to the first base station is stopped.

12. The method of claim 8, wherein the at least one recommended interference mitigation procedure comprises at least one of:

adjusting a transmitting beam angle at the second base station, adjusting an operating frequency band operated at the second base station; or updating a Time Division Duplexing (TDD) configuration.

13. The method of claim 8, wherein the first message further comprises a victim set identifier (ID) identifying the first base station.

14. The method of claim 9, wherein:

the first base station is managed by the second SMO device;

the second base station is managed by the first SMO device;

the first SMO device is associated with the first TDD-connected set;

the second SMO device is associated with a second TDD-connected set; and the first TDD-connected set is distinct from the second TDD-connected set.

15. A non-transitory computer-readable medium storing instructions that when executed by one or more processors, cause the one or more processors to:

store information identifying a second SMO device;

receive, from the second SMO device, a first message indicating that a first base station is experiencing interference from a second base station, wherein the first message comprises an aggressor set identifier (ID) identifying the second base station;

identify the second base station based at least in part upon the aggressor set ID;

receive, from the second SMO device, at least one recommended interference mitigation procedure to address the interference experienced by the first base station;

select a first interference mitigation procedure from among the at least one recommended interference mitigation procedure;

perform the first interference mitigation procedure; and communicate, to the second SMO device, a second message indicating that the first interference mitigation procedure has commenced.

16. The non-transitory computer-readable medium of claim 15, wherein instructions further cause the processor to:

determine that the first interference mitigation procedure comprises updating a Time Division Duplexing (TDD) configuration for a set of base stations operating in a first TDD-connected set, wherein the set of base stations comprises the second base station; and in response to determining that the first interference mitigation procedure comprises updating the TDD configuration for the set of base stations operating in the first TDD-connected set:

update the TDD configuration for the set of base stations; and communicate the updated TDD configuration to the set of base stations.

17. The non-transitory computer-readable medium of claim 16, wherein updating the TDD configuration comprises changing a required guard time, wherein the required guard time indicates a required time gap between an uplink transmission and a downlink transmission for each of the set of base stations operating the first TDD-connected set.

18. The non-transitory computer-readable medium of claim 15, wherein:

a third message comprising the aggressor set ID is sent to the first base station in response to first message being received by the first SMO device; and in response to the first interference mitigation procedure being commenced, a transmission of the aggressor set ID to the first base station is stopped.

19. The non-transitory computer-readable medium of claim 15, wherein the at least one recommended interference mitigation procedure comprises at least one of:

adjusting a transmitting beam angle at the second base station;

adjusting an operating frequency band operated at the second base station; or updating a Time Division Duplexing (TDD) configuration.

20. The non-transitory computer-readable medium of claim 15, wherein the first message further comprises a victim set identifier (ID) identifying the first base station.

* * * * *